United States Patent [19]

Larson

[11] Patent Number: 5,220,651

[45] Date of Patent: Jun. 15, 1993

[54] CPU-BUS CONTROLLER FOR ACCOMPLISHING TRANSFER OPERATIONS BETWEEN A CONTROLLER AND DEVICES COUPLED TO AN INPUT/OUTPUT BUS

[75] Inventor: Ronald J. Larson, Minneapolis, Minn.

[73] Assignee: Micral, Inc., New Brighton, Minn.

[21] Appl. No.: 419,096

[22] Filed: Oct. 11, 1989

[51] Int. Cl.[5] .................. G06F 13/00; G06F 13/38
[52] U.S. Cl. .................... 395/250; 395/500
[58] Field of Search ............ 364/200, 900, 240.5; 395/250, 500

[56] References Cited

U.S. PATENT DOCUMENTS

| | | | |
|---|---|---|---|
| 3,969,722 | 7/1976 | Danco | 364/200 |
| 4,124,889 | 11/1978 | Kaufman et al. | 364/200 |
| 4,245,301 | 1/1981 | Rokutanda et al. | 364/200 |
| 4,268,904 | 5/1981 | Suzuki et al. | 364/200 |
| 4,315,308 | 2/1982 | Jackson | 364/200 |
| 4,363,094 | 12/1982 | Kaul et al. | 364/200 |
| 4,400,778 | 8/1983 | Vivian et al. | 364/200 |
| 4,449,181 | 5/1984 | Young et al. | 364/200 |
| 4,475,155 | 10/1984 | Oishi et al. | 364/200 |
| 4,476,527 | 10/1984 | Clayton, IV | 364/200 |
| 4,491,916 | 1/1985 | Vallhourat | 364/200 |
| 4,562,533 | 12/1985 | Hodel et al. | 364/200 |
| 4,602,327 | 7/1986 | Laviolette | 364/200 |
| 4,727,491 | 2/1988 | Culley | 364/200 |
| 4,787,032 | 11/1988 | Culley | 364/200 |
| 4,835,681 | 5/1989 | Culley | 364/200 |
| 4,845,611 | 7/1989 | Tuklakov et al. | 395/250 |
| 4,845,614 | 7/1989 | Hanawa et al. | 364/200 |
| 4,847,757 | 7/1989 | Smith | 364/200 |
| 4,987,529 | 1/1991 | Craft et al. | 364/200 |

OTHER PUBLICATIONS

Fletcher, An Engineering Approach to Digital Design 1980 pp. 290–295.

*Primary Examiner*—Dale M. Shaw
*Assistant Examiner*—Dung C. Dinh
*Attorney, Agent, or Firm*—Kinney & Lange

[57] ABSTRACT

A synchronous bus controller which provides a functional control link between one or more microprocessors and an asynchronous main input/output bus is provided. The bus controller includes a state machine and data bus width determining logic enabling the bus controller to initiate and control access operations between microprocessors and accessible devices on the main input/output bus when the microprocessor and the accessed device may have different data bus widths. The bus controller includes logic circuitry to determine the number of access cycles required to complete a requested access operation and detects the last access cycle of a current access operation to terminate an access operation and provide a ready signal to the microprocessor indicating that the bus controller is ready for the next access request.

26 Claims, 22 Drawing Sheets

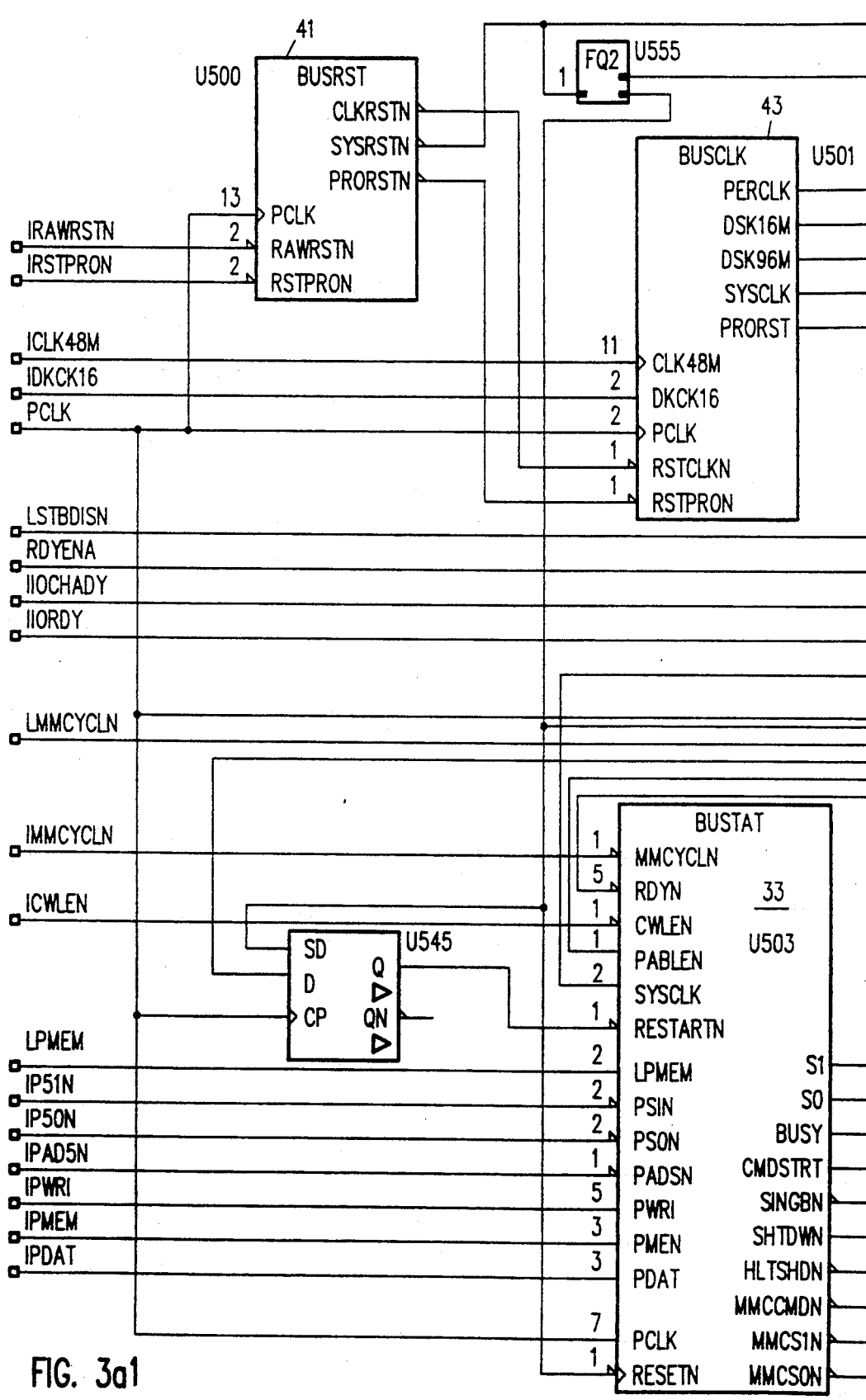
FIG. 3a1

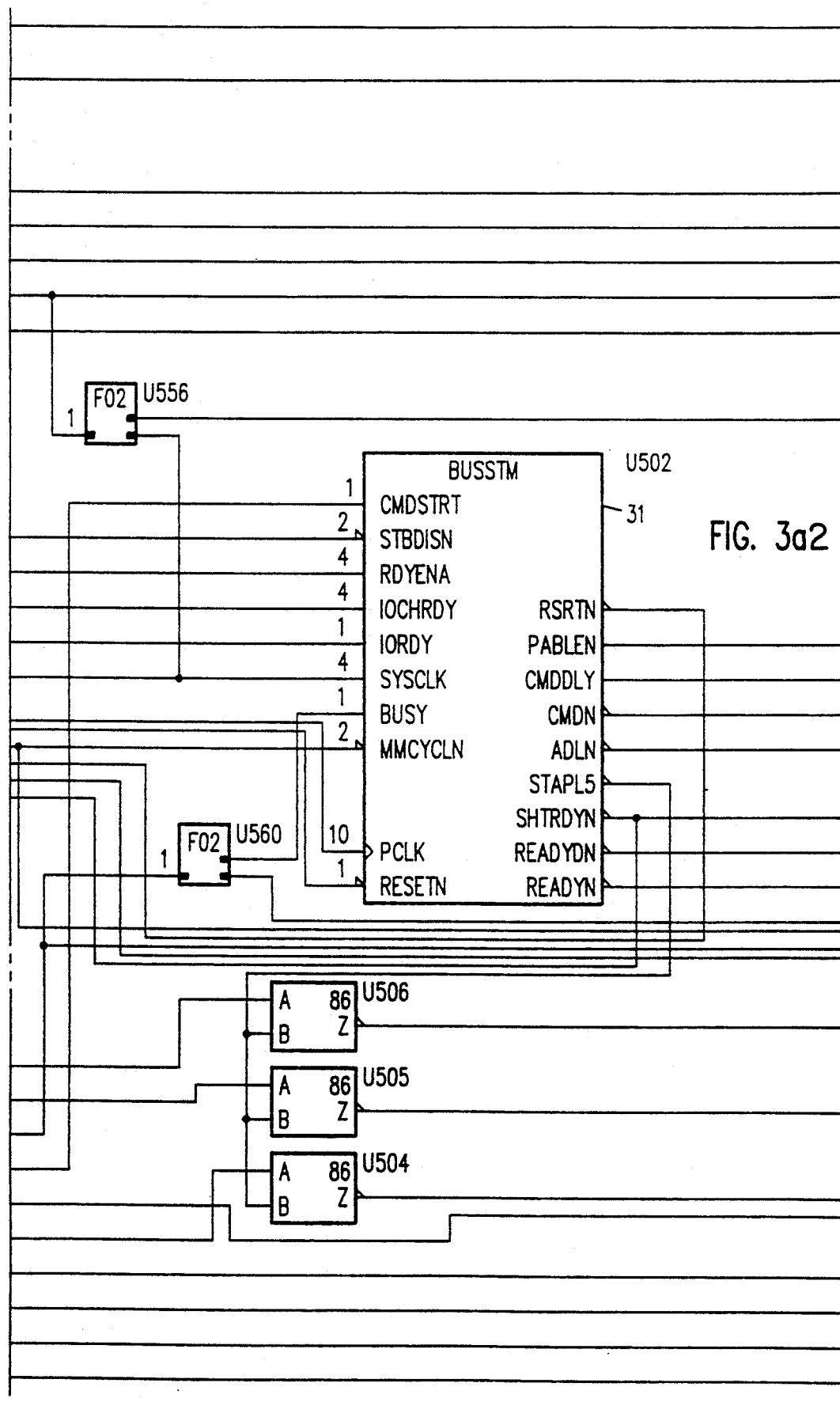

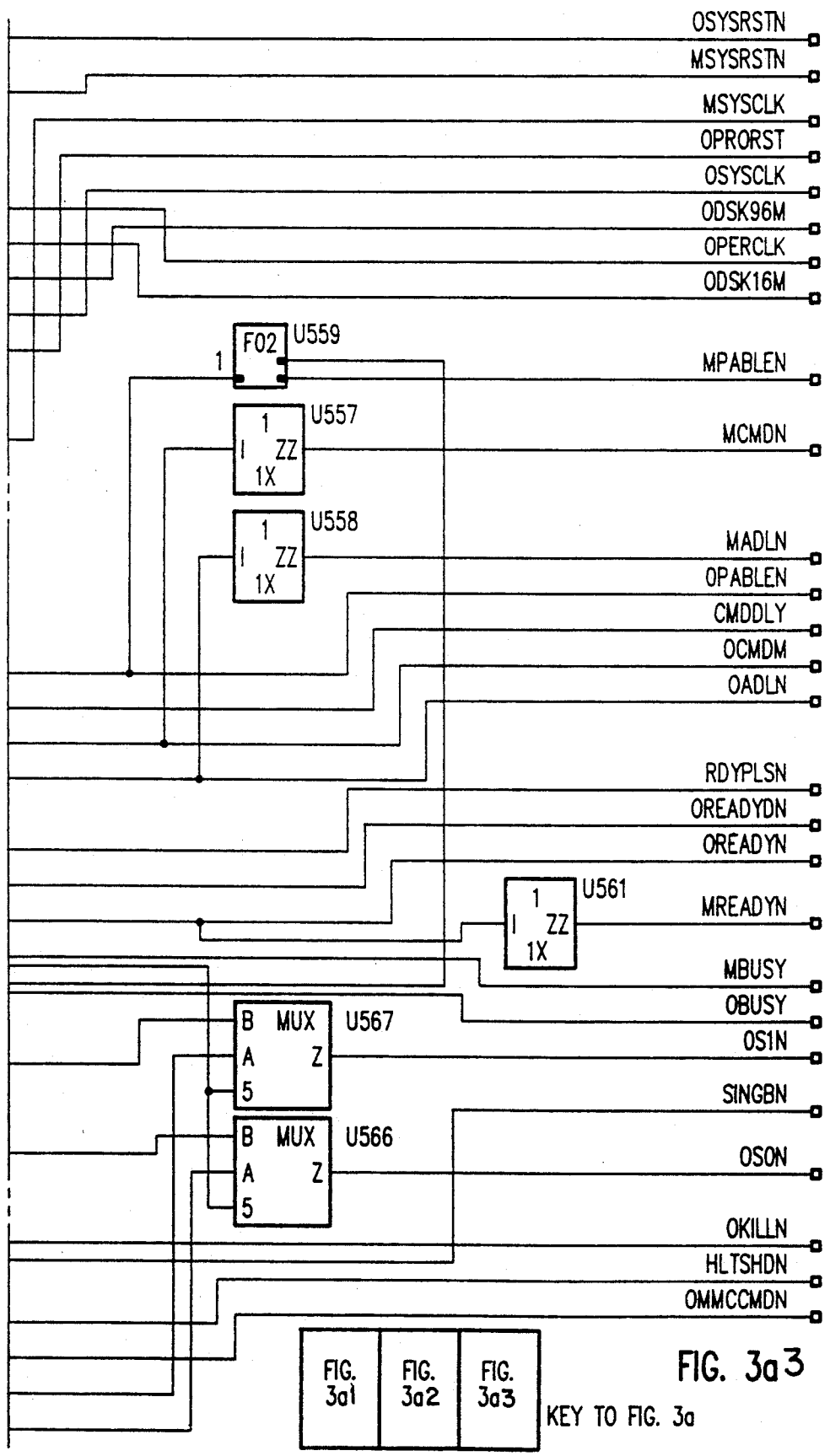

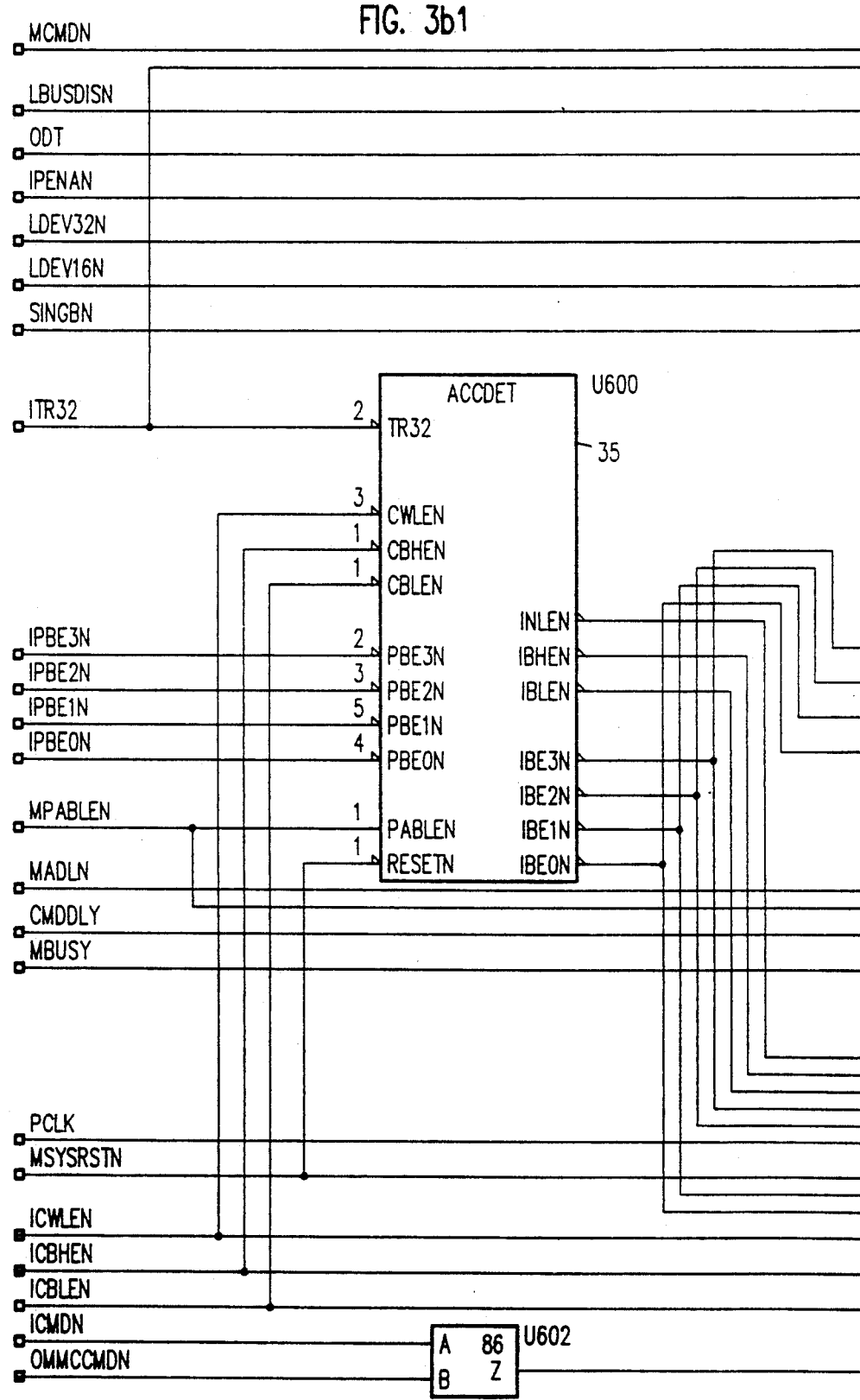

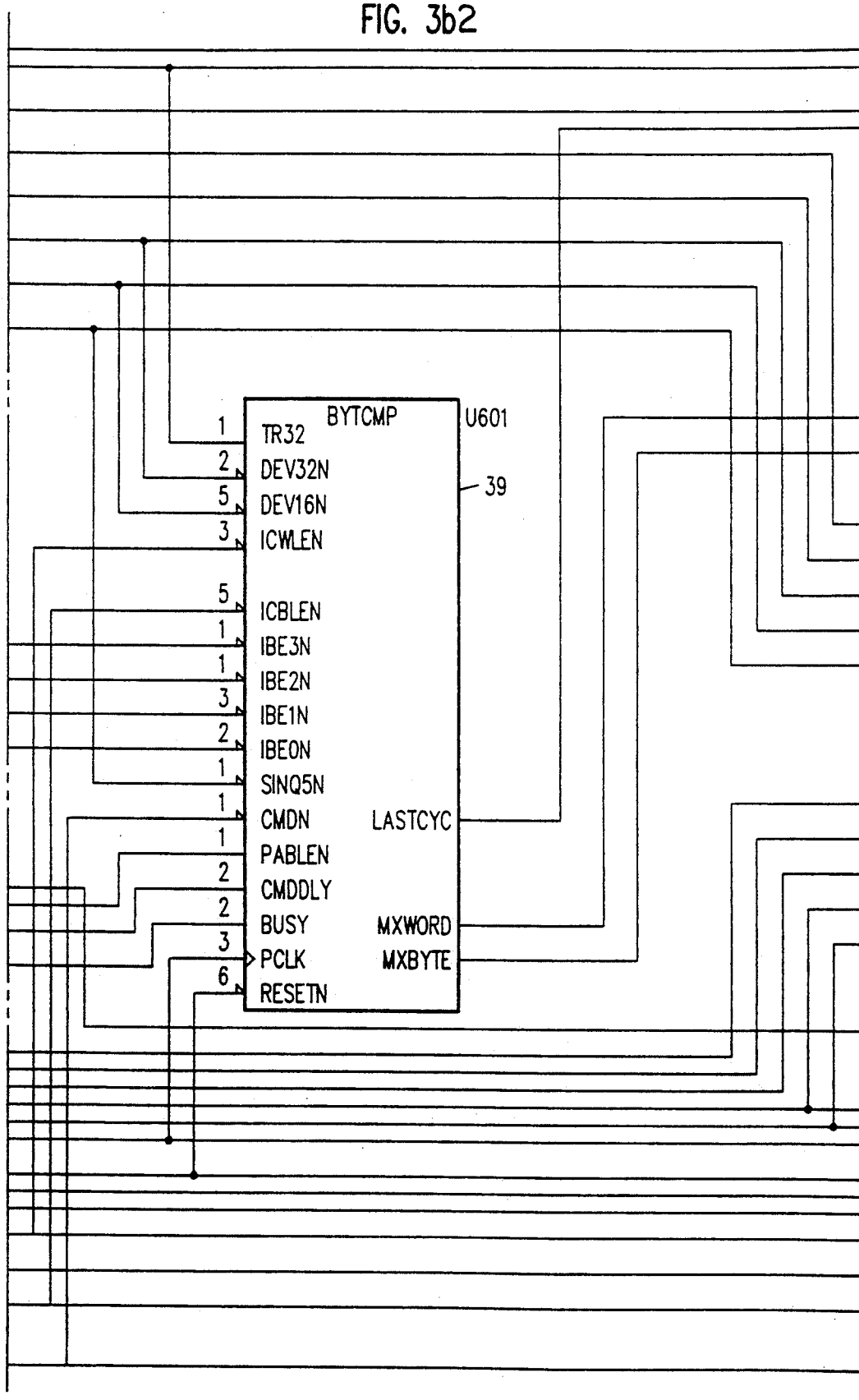
FIG. 3b2

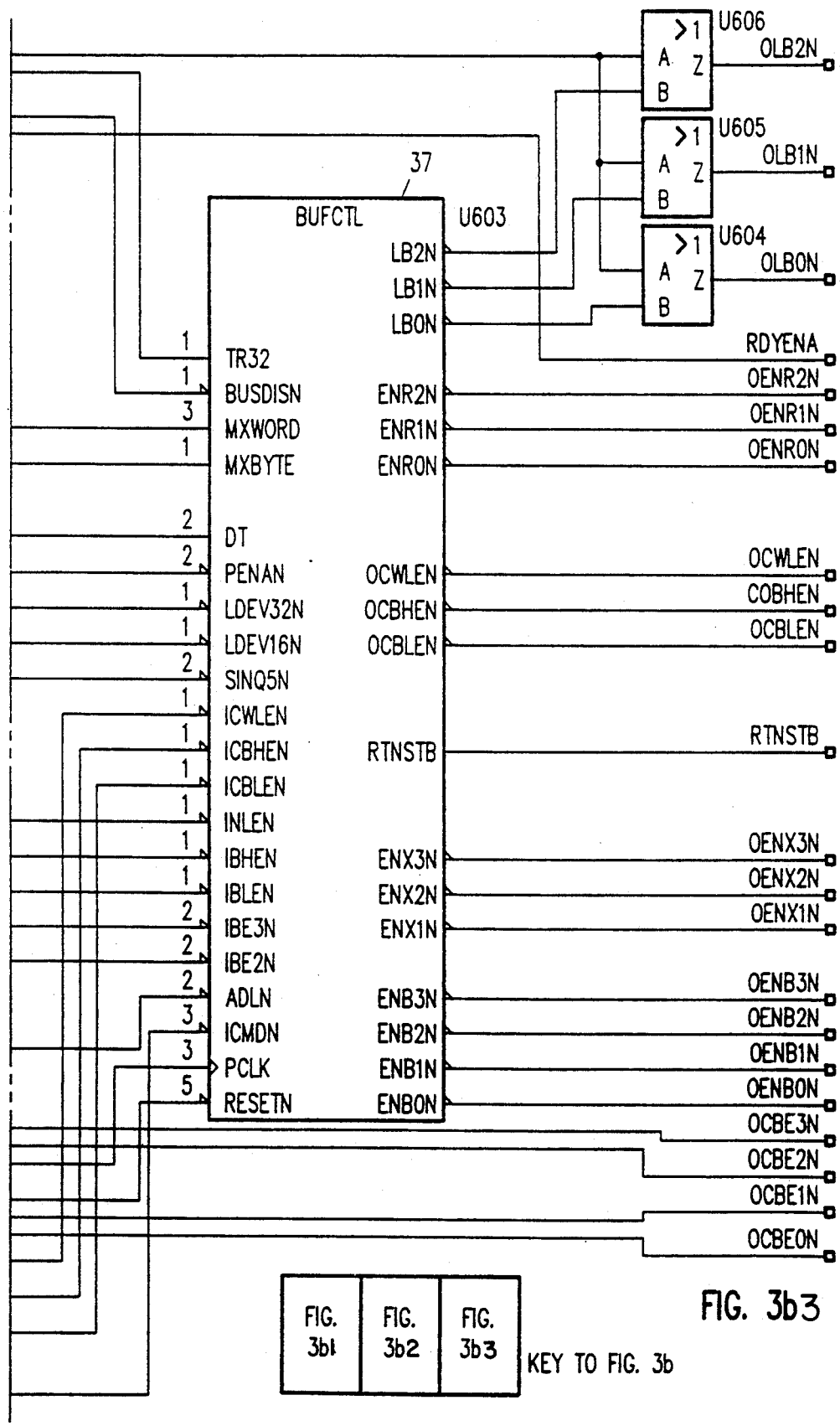
FIG. 3b3

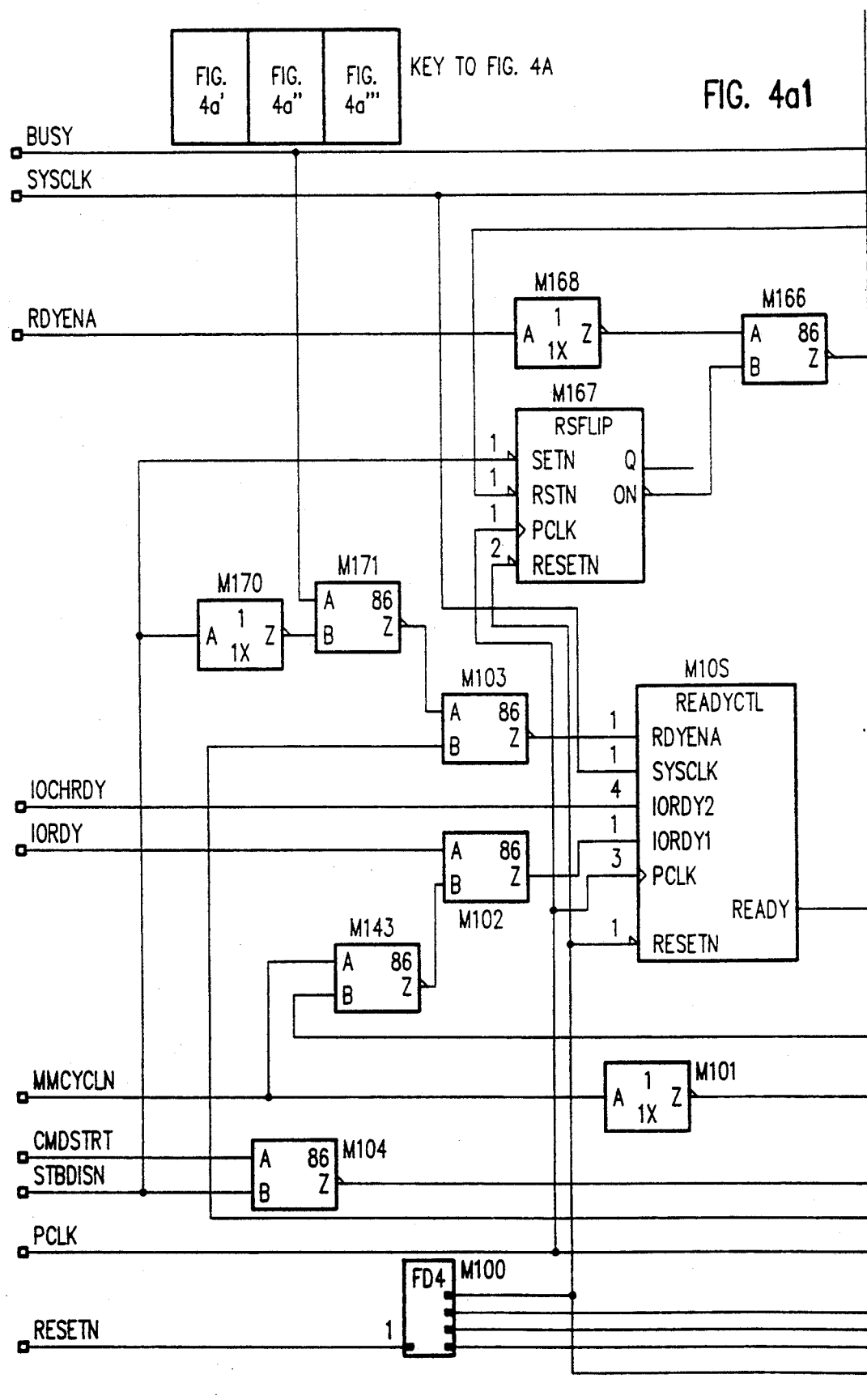
FIG. 4a1

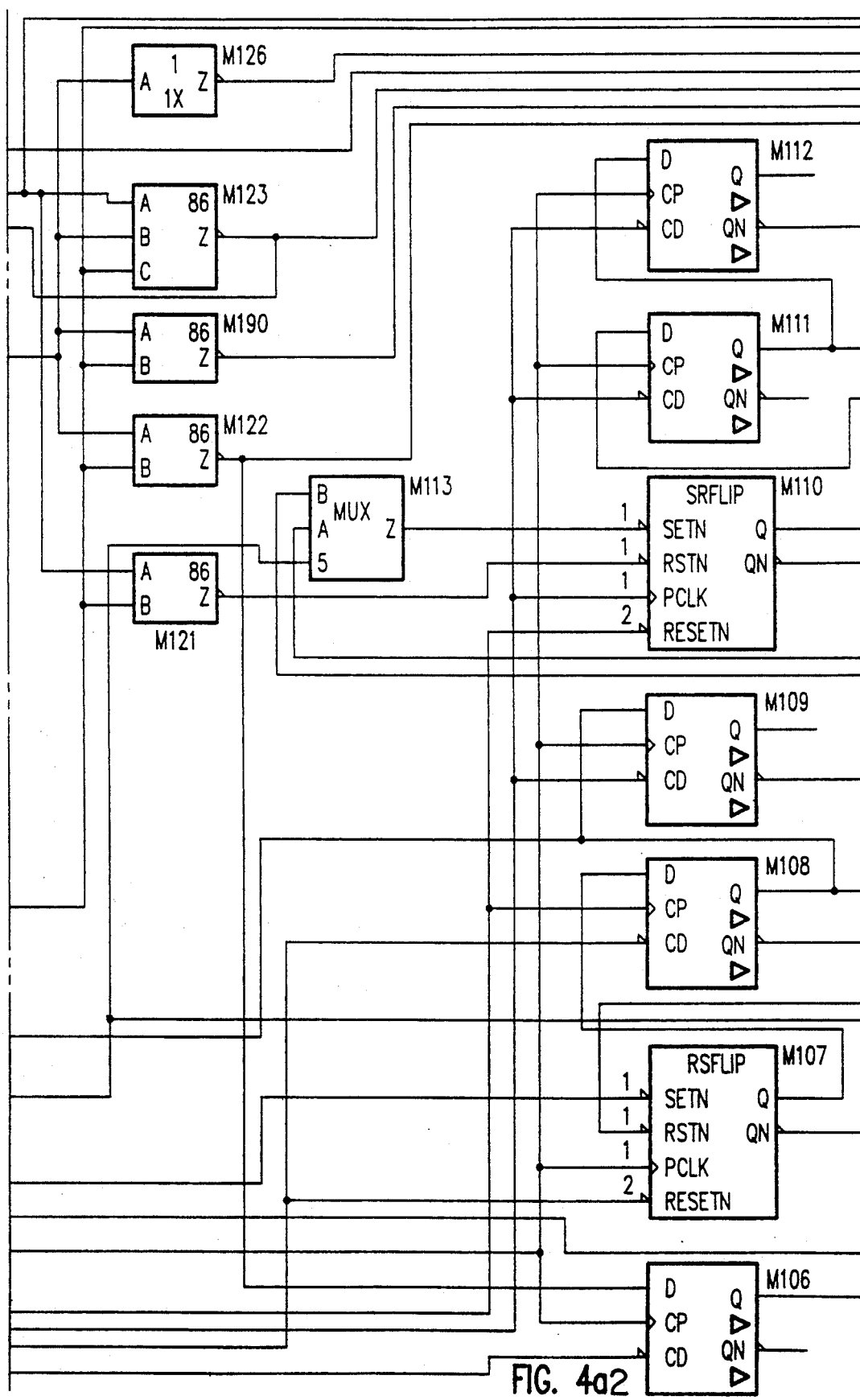
FIG. 4a2

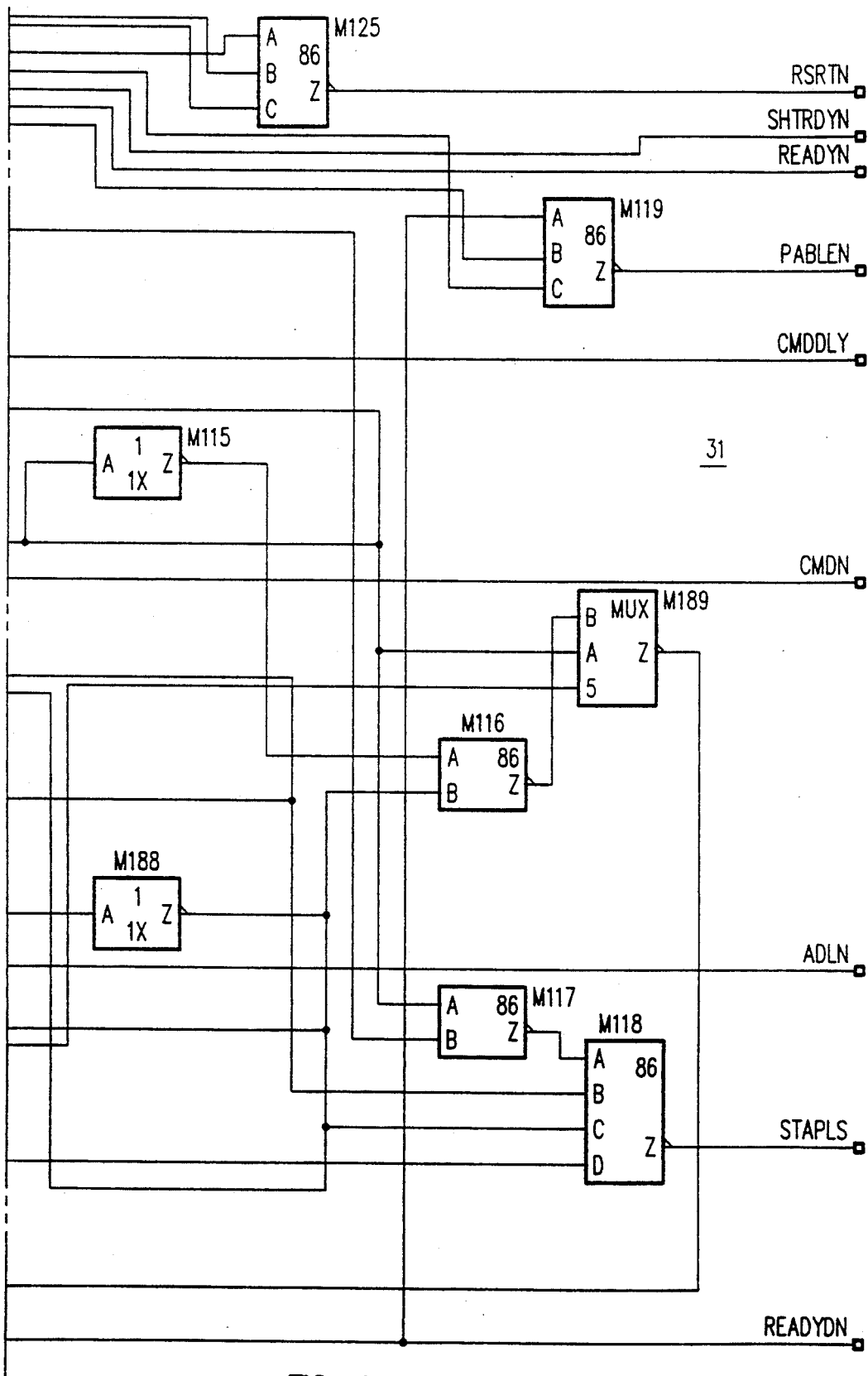
FIG. 4a3

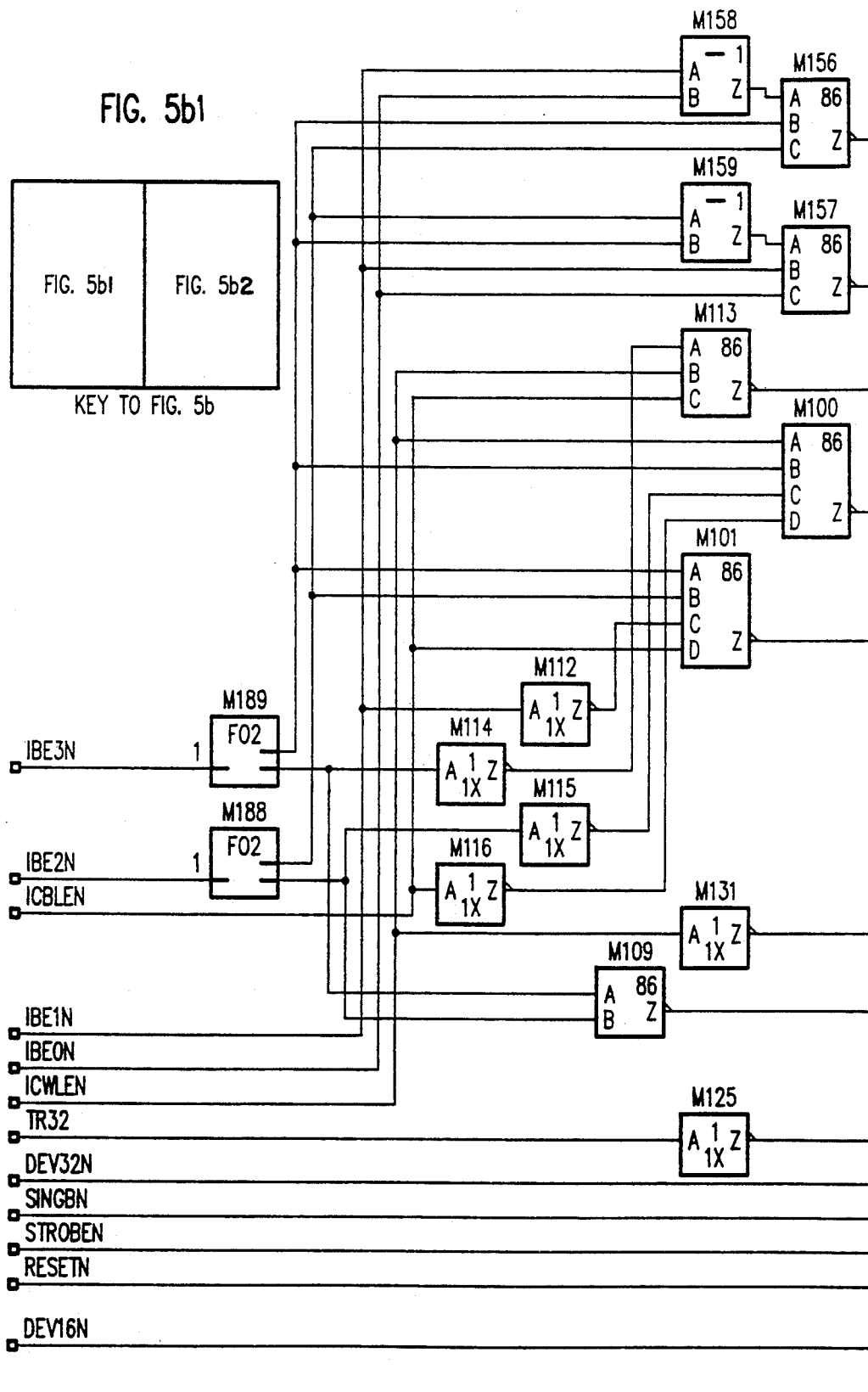
FIG. 5b1

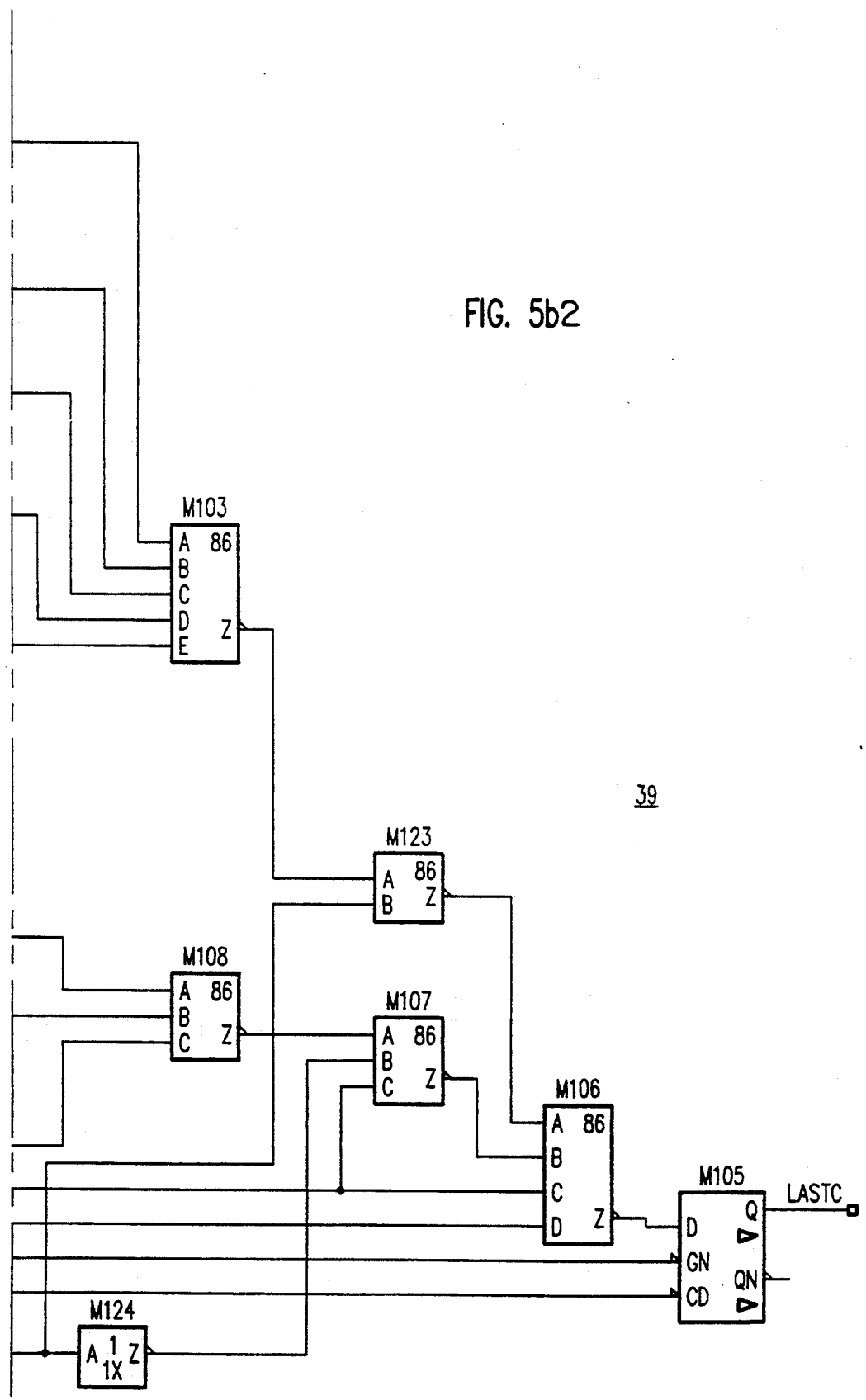
FIG. 5b2

CPU-BUS CONTROLLER FOR ACCOMPLISHING TRANSFER OPERATIONS BETWEEN A CONTROLLER AND DEVICES COUPLED TO AN INPUT/OUTPUT BUS

BACKGROUND OF THE INVENTION

The present invention relates to microprocessor bus controllers and in particular to bus controllers incorporating state machine technology to provide a functional link between microprocessors having different size data widths, and a data bus which allows access to devices having different size data widths on the data bus.

In a microprocessor controlled computer system such as a personal or desk top computer, the computer requires a set of electronic connections between the microprocessor and other devices making up- the computer system. These communication lines are collectively called the input/output system or I/O bus. All messages in data pass between the microprocessor and other system components travel on the bus. A complete I/O bus includes several component parts: the data bus, lines over which data flows; the address bus, a set of lines that specify the memory addresses to which data will be transferred; and various support lines carrying control signals and power for the various devices on the bus. A bus controller initiates and controls all I/O bus cycles. The controller controls the interface to the I/O bus, the address and data buffers, the CPU, the direct memory access (DMA) device and other memory controllers.

Prior art bus controllers were integrated into and functioned as a part of the microprocessor architecture. As microprocessor technology has advanced, bus controller technology has become separate and distinct. Similarly, as the number of peripheral devices available for use with various microprocessors has increased, it has become obvious that peripheral devices usable with one integrated microprocessor-bus controller architecture can not generally be used with the bus controller of another microprocessor.

Separate microprocessor and bus controller architectures provide system design flexibility as well as facilitating interface of many peripheral devices among many different microprocessors. In the present state of the art, microprocessors are expected to interface with memory manage units, CRT controllers, floppy disc controllers, hard disc controllers, arithmetic cove processors and the like. In addition, it is well known that the next generation of 32-byte microprocessors must be able to interface with already existing peripheral devices without the immediate need for specifically designed bus controllers.

However, even though the present day microprocessor and bus controller architectures are separated, bus controllers designed to interface with a specific type or range of types of microprocessors and peripheral devices are still limited to certain system configurations and further limit design flexibilitas for the next generation of microprocessors. See for example the well-known personal computer models known as the "PC XT" and "PC AT", manufactured and marketed by the IBM Corporation.

In the past, I/O bus structures and small microprocessor based computer systems comprised little more than buffered extensions of the microprocessor I/O pins. While microprocessors speeds, data widths, architecture and I/O protocols evolve at a rapid rate, system level I/O bus configurations remain essential unchanged in structure and timing for five to ten years. For example, reflecting the capabilities of its 8-bit 8088 microprocessor, the original IBM PC utilizes an I/O bus which permits only eight bits of data to be transferred at one time. With the more advanced PC AT, while maintaining the simplicity in functionality of the original PC I/O bus, IBM added an additional 8 data lines to the I/O bus to provide for 16-bit data transfers. More recently, new more sophisticated I/O buses having greater capabilities have been developed; for example, the IBM "Micro Channel" I/O bus developed for IBM's new "PS/2" computer models. IBM's basic micro-channel design supports 8-bit data transfers with additional pins provided for 16- and 32-bit operations. The biggest advantage of the new micro-channel type I/O buses, is their "multiple master architecture" which allows microprocessors on expansion boards to have full access to the computer system's resources. In order to achieve capabilities and functionality of the new buses, a bus controller is required which automatically accommodates one or more microprocessors, which may have different word or data widths and which allows the microprocessors to access other devices, "slaves", on the bus which may have different data width sizes from each other and from the microprocessors.

SUMMARY OF THE INVENTION

A microprocessor and I/O bus controller according to the principles of the present invention comprises a state machine I/O bus controller which provides a functional control link between the microprocessors and the main I/O data bus. The bus controller provides the signals required to control the data flow to and from the I/O bus. It further generates the control strobes required to facilitate communication between the microprocessors and plug in adapters of 8-,16- or 32-bit widths. While the interface between the microprocessors and the bus controller is synchronous in nature, the I/O bus interface may be asynchronous. The microprocessors can have a data width of 16 or 32 bits or more while the devices on the I/O bus can have data widths of 8, 16 or 32 bits. Any difference between the data width size of a microprocessor and the bus device accessed is automatically accommodated by the bus controller state machine. The use of a state machine within a bus controller provides the ability to change the function and timing of various signals quickly and easily, and also provides the means to change the bus cycle functionality and timing (in a dynamic sense) in response to I/O conditions or specific microprocessor access requests. The bus controller also provides reset control and clock generation logic for the computer system.

In the bus controller of the present invention, the state machine senses and evaluates an access request from a microprocessor; i.e., what kind of processor 16- or 32-bit processor, and which bits have been requested, etc. Then the state machine evaluates the data bus width of the device which is being accessed by the microprocessor request to determine the proper action to be taken. For example, if a 32-bit microprocessor requests 32 bits of data from an 8-bit device, the bus controller accesses that 8-bit device 4 times in succession, to gather the requested data bits and then passes all 32 bits to the microprocessor simultaneously. Thus, the microprocessor and its controlling application software typically do not have to be aware of data bus widths, because the bus controller automatically accommodates any differences in data widths between the microprocessor and the accessed device. The bus controller includes logic to determine the number of I/O bus cycles required to satisfy a microprocessor data request to accommodate for the differences in data width sizes between a microprocessor and accessed device. Thus, while the bus controller will generate the 4 byte enable bytes required for any microprocessor access request, if a 16-bit wide microprocessor requests 16 bits of data from a 32-bit wide memory device, the bus controller will only access the memory device once to transfer the two bytes to satisfy the 16-bit data request.

The implementation of the bus controller of the present invention also provides additional features. For example, if a microprocessor needs to access a co-microprocessor, which is physically not on the system main I/O bus, but on the microprocessor board, then the bus controller disables the data buffers to and from the main I/O bus to allow the microprocessor to access the co-microprocessor. Further, the bus controller generates special control signals that disables the I/O bus data buffers and the I/O bus control strobes generated to allow a read access to "private" on board system memory, to allow a much faster access than could be achieved through the system main I/O bus. The bus controller of the present invention can be implemented as a single VLSI component. This allows very efficient use of logic partition and reduction of the total computer system component devices. Furthermore, the system operates faster because of tighter logic integration.

BRIEF DESCRIPTION OF THE DRAWINGS

FIGS. 3a, 3b and 3c are a functional block diagram of the CPU/Bus controller shown in FIG. 2;

FIGS. 4a and 4b are a logic diagram of the state machine shown in FIGS. 2 and 3a;

FIGS. 5a and 5b are a logic diagram of the last cycle detect circuitry shown in FIGS. 2 and 3a;

DETAILED DESCRIPTION OF THE PREFERRED EMBODIMENT

Figure 1:
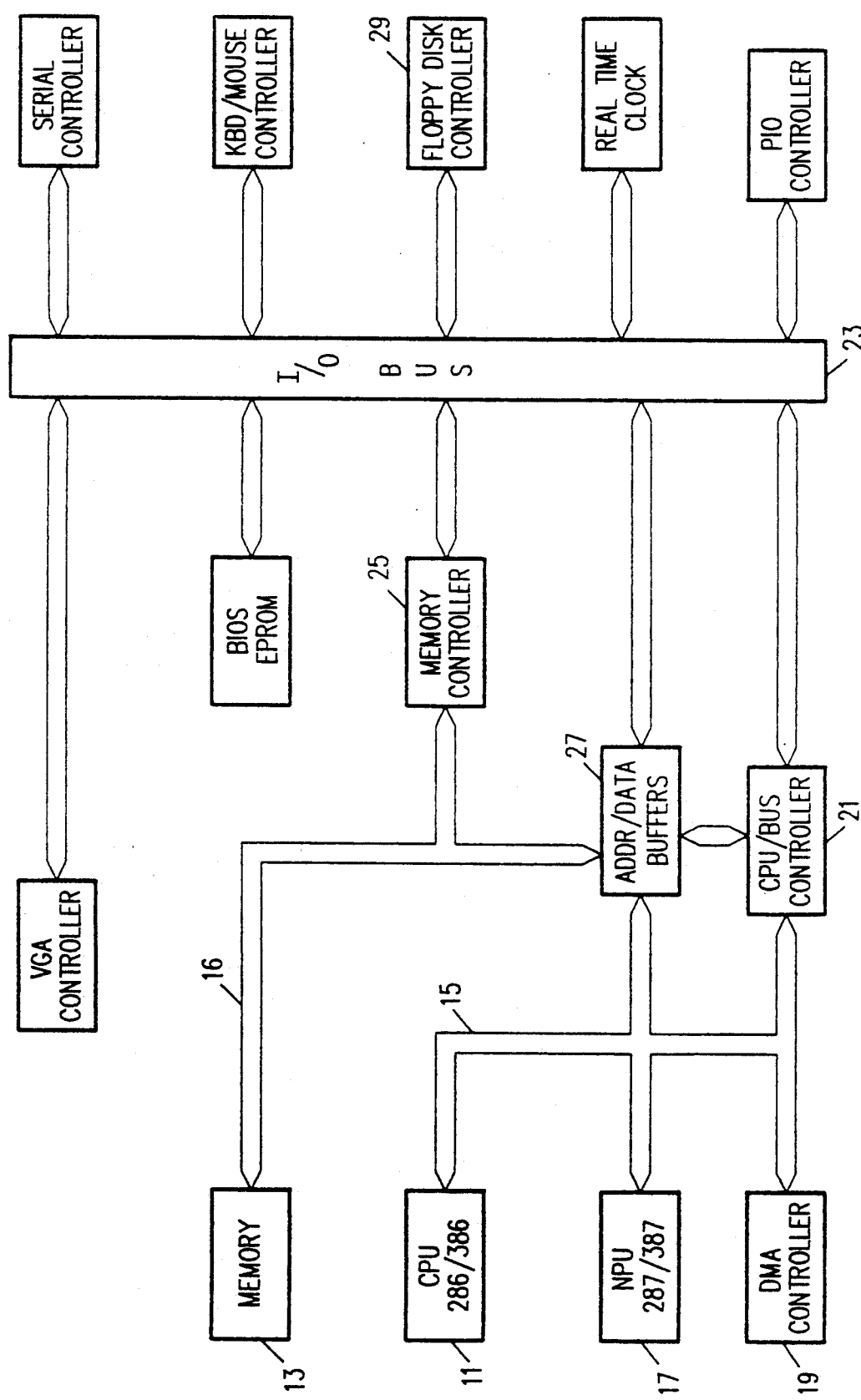
FIG. 1 is a block diagram of a typical microprocessor-controlled computer system incorporating an I/O bus and a CPU/Bus controller according to the principals of the present invention.

Referring now to FIG. 1 the microprocessor controlled computer system block diagram is shown. The system is controlled by a central processing unit (CPU) 11, such as a 32-bit microprocessor part number 80386, manufactured by Intel Corporation described in the Intel "Microprocessor and Peripheral Handbook", Volume One, Microprocessor, 1988, on pages 4-1 through 4-128, and is incorporated by reference as if fully set forth herein. The CPU 11 is connected through buffers 27 to the main system memory 13 via local bus 15 and a memory bus 16. Also connected to the local bus 15 is a math co-processor or NPU 17 and a direct memory access (DMA) controller 19. An 80-bit numeric processor extension, part number 80387, manufactured by Intel Corporation, may be used as the math co-processor 17. The main system memory 13, which can be expanded up to eight megabytes or more of page/interleaved memory, is also coupled to a memory controller 25 and to the address/data buffers 27 via memory bus 16. The CPU 11, NPU 17 and DMA controller 19 are also coupled to the address/data buffers 27 and the CPU/Bus controller 21 via the local bus 15. To provide access to the remaining components of the computer system, the microprocessors 13,17, the DMA controller 19 and main system memory 13 are coupled to the system main I/O bus 23 via the address/data buffers 27. The remaining system components such as floppy disc controller 29 and others as shown are connected to the system main I/O bus 23. The system main I/O bus 23 is a 32-byte wide "arbitrated" bus similar to the IBM Micro Channel or an Apple Computer, Inc's Nubus. The architecture of this type of I/O bus provides the capability of microprocessors on add-in cards connected to the bus, to act as "master" processors on a par with the main system microprocessor 11 and which may assume temporary control of the entire system. Arbitration circuitry (not shown) included in the I/O bus 23 architecture, allocates microprocessor bus access and assures that no one device can monopolize the I/O bus. The I/O bus 23, provides full support for add-on cards, allowing other devices such as graphic printer controllers, or high resolution graphic display boards to be added to this system. The use of the I/O bus 23 enables access to the devices on the I/O bus 23 and is controlled by the CPU/Bus controller 21.

Figure 2:
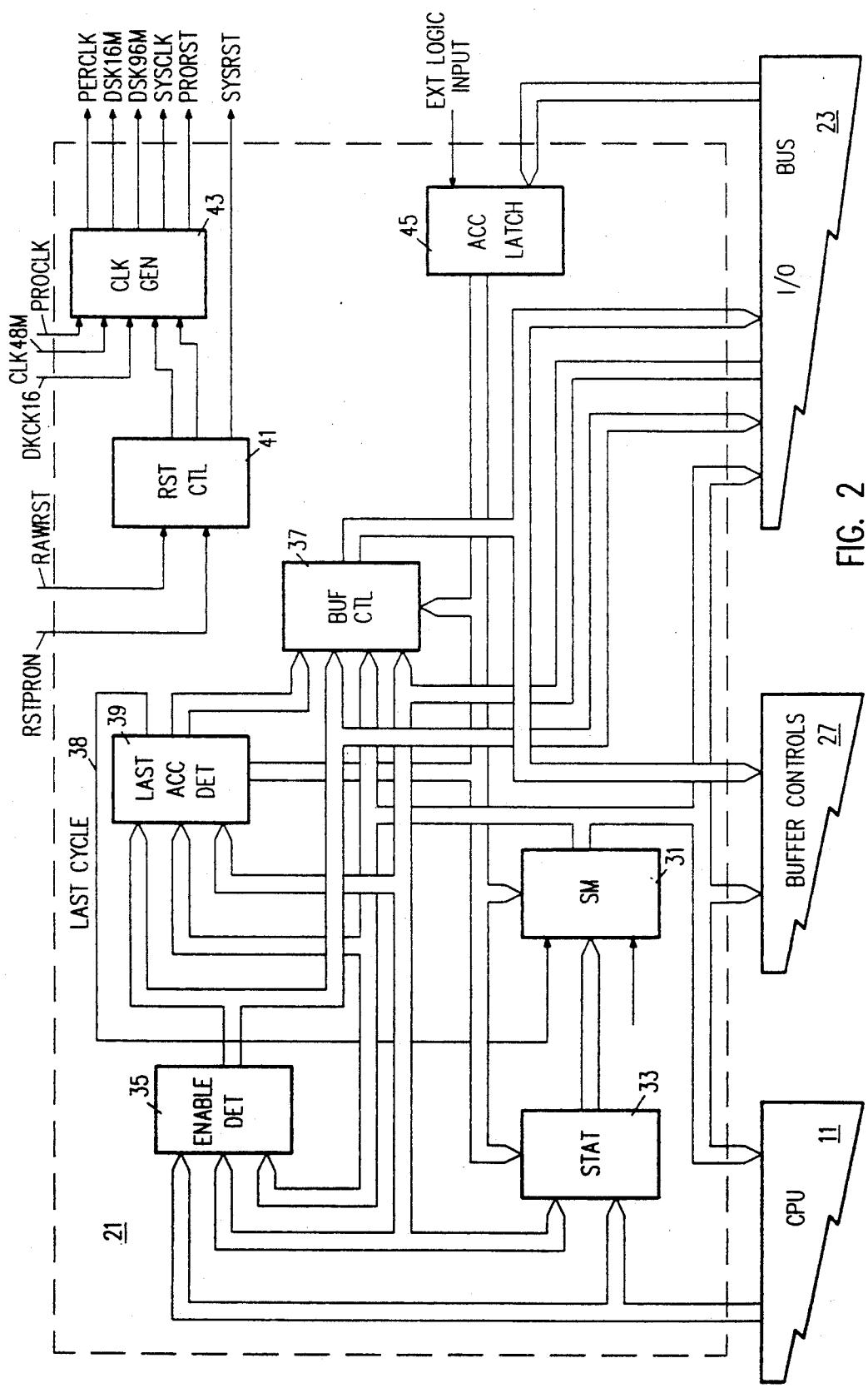
FIG. 2 is a block diagram of a CPU/Bus controller according to the principles of the present invention.

Referring now, also to FIG. 2, a functional block diagram of the CPU/Bus controller 21 constructed according to the principles of the present invention is shown. The CPU/Bus controller 21 performs the I/O bus control functions for a multiprocessor computer system and acts as the functional control link between the microprocessors 11,17 and the main I/O bus 23. The CPU/Bus controller 21 controls the interface between the CPU 11, NPU 17, DMA controller 19, the main system memory 13, the address/data buffers 27 and the memory controller 25 and the main I/O bus 23. The CPU/Bus controller operations with the CPU 11 are synchronous in nature while the operations with the I/O bus 23 are essential asynchronous. The function link or interface between the CPU 11 and the I/O bus 23 is accomplished by a state machine 31 in the CPU/Bus controller 21. The CPU/Bus controller 21 comprises 8 blocks or sections. These blocks are the clock generator 43, reset control 41, status interpreter 33, byte enable detect 35, last cycle detect 39, state machine 31, access latches 45 and buffer control/byte enable 37. The major signals utilized by the CPU/Bus controller 21 are listed and defined in Appendix I attached hereto.

The clock generation section of the CPU/Bus controller 21 generates clock signals for various other sections of the computer system and comprises the reset control block 41 and the clock generator block 43. The reset control circuit 41 provides the proper timing and pulse width for a microprocessor reset signal and a system reset signal derived from a raw reset signal. The reset control circuitry 41 couples the microprocessor reset signal to the clock generator 43 where the processor reset signal is synchronized with the processor clock. The clock generator 43 generates various clock signals to be used in other functional sections of the computer system; e.g., serial port communications and floppy disk controller functions. The main clock input signal, CLK48M, to the clock generator 43 has a frequency of 48 megaHertz (MHz). This 48 MHz clock signal is frequency divided to provide a peripherals clock, PERCLK, signal having a frequency of 1.846 MHz. The main clock input signal is also divided by 3 to provide a disk clock, DSK16M, signal of 16 MHz which can be used by the floppy disk controller or any other system element requiring a 16 MHz clock. A variable frequency clock, DSK96M, signal is derived from the main clock input signal and has a frequency of 9.6 MHz or 16 MHz depending on the state of the DKCK16 input signal to the clock generator circuit 43. A system clock, SYSCLK, signal is derived from the processor clock, CLKPRO, input to the clock generator 43 and has a frequency equal to one-half the frequency of the processor clock. The system clock is used to synchronize the CPU/Bus controller 21 with the microprocessor 11 and the memory controller 25. When the CPU 11 comprises a 80386 microprocessor, the processor clock has a frequency of 40 MHz which yields a system clock of 20 MHz.

The status interpreter block 33, the byte enable detect block 35 and the last cycle detect block 39 comprise a CPU interface section in the CPU/Bus controller 21. This section responds to an access request from the CPU 11, as indicated for example, by a /ADS signal from the microprocessor 11 in the case of a 80386 microprocessor. The response can be in the form of a I/O bus access to memory or to a port location. The type of access requested is defined by the signals WRITE, DATA, and MEM/IO in the case of an 80386 microprocessor. This access can be a read or a write and typically takes place through the I/O Bus 23. In addition to normal read/write accesses, the CPU/Bus controller 21 also handles the system cycles for interrupt acknowledge, halt and shutdown. A halt access stops the microprocessor and is not an I/O bus operation in that no data transaction occurs. The shutdown access is also not an I/O bus operation, but in this case the CPU/Bus controller issues a reset signal to the microprocessor. In a normal cycle, the microprocessor concludes the I/O bus access request by sampling a READY signal generated by the CPU/Bus controller state machine 31 at the completion of an access request. When the microprocessor 11 detects the presence of the ready signal, the current access cycle will be concluded if the SYSCLK signal is active, and the next access requested may begin.

The status interpreter block 33 interprets status information input from the I/O bus 23 and microprocessor request information input from the CPU 11 to detect that the microprocessor has requested a bus access or an access to the system memory 13. In accordance with Table 1 below, the status interpreter 33 determines what type of access has been requested and provides the proper stimulus signals to the state machine 31 to commence the proper I/O bus 23 cycle activity.

TABLE 1

|  | PWRI | PDAT | PMEM | S0N | S1N |
|---|---|---|---|---|---|
| INTERRUPT ACKNOWLEDGE | 0 | 0 | 0 | 0 | 0 |
| CODE READ {memory read} | 0 | 0 | 1 | 1 | 0 |
| IO READ | 0 | 1 | 0 | 1 | 0 |
| MEMORY READ | 0 | 1 | 1 | 1 | 0 |
| NA | 1 | 0 | 0 | 1 | 1 |
| HALT {address=2} | 1 | 0 | 1 | 0 | 0 |
| SHUTDOWN {address=0} | 1 | 0 | 1 | 0 | 0 |
| IO WRITE | 1 | 1 | 0 | 0 | 1 |
| MEMORY WRITE | 1 | 1 | 1 | 0 | 1 |

In response to information and control signals from the CPU 11 and the I/O bus 23 the bit enable detect block 35 evaluates the data bus width of the microprocessor 11 and the bit enable signal input information in accordance with Table 2 for a 32-bit microprocessor and Table 3 for a 16-bit microprocessor to determine which data bits are being requested by the CPU 11. This information is then relayed to the I/O bus 23 as well as other sections of the CPU/Bus controller to properly access the requested data. The last cycle detect block 39 evaluates input information from the I/O bus 23, the byte enable detect block 35, the CPU/Bus controller state machine 31 and the data width of the device being accessed to determine if the current I/O bus 23 access cycle is the last access cycle needed to fulfill the current microprocessor 11 request. If the present bus access cycle is the last access cycle required, the CPU/Bus controller 23 generates a ready signal to the microprocessor to allow the microprocessor 11 to proceed with the next request. The last cycle detect block 39 also generates the bit enable (i.e., addresses) manipulation control signals for the buffer control/byte enable block 37.

TABLE 2

| 32-BIT PROCESSOR | | | | | | | | | | |
|---|---|---|---|---|---|---|---|---|---|---|
| PBE3N | PBE2N | PBE1N | PBE0N | CWLEN | CBHEN | CBLEN | CBE3N | CBE2N | CBE1N | CBE0N |
| 1 | 1 | 1 | 0 | 0 | 1 | 0 | 1 | 1 | 1 | 0 |
| 1 | 1 | 0 | 1 | 0 | 0 | 1 | 1 | 1 | 0 | 1 |
| 1 | 0 | 1 | 1 | 1 | 1 | 0 | 1 | 0 | 1 | 1 |
| 0 | 1 | 1 | 1 | 1 | 0 | 1 | 0 | 1 | 1 | 1 |
| 1 | 1 | 0 | 0 | 0 | 0 | 0 | 1 | 1 | 0 | 0 |
| 1 | 0 | 0 | 1 | 0 | 0 | 1 | 1 | 0 | 0 | 1 |
| 0 | 0 | 1 | 1 | 1 | 0 | 0 | 0 | 0 | 1 | 1 |
| 1 | 0 | 0 | 0 | 0 | 0 | 0 | 1 | 0 | 0 | 0 |
| 0 | 0 | 0 | 1 | 0 | 0 | 1 | 0 | 0 | 0 | 1 |
| 0 | 0 | 0 | 0 | 0 | 0 | 0 | 0 | 0 | 0 | 0 |

TABLE 3

| 16-BIT PROCESSOR | | | | | | | | | | |
|---|---|---|---|---|---|---|---|---|---|---|
| PBE3N | PBE2N | PBE1N | PBE0N | CWLEN | CBHEN | CBLEN | CBE3N | CBE2N | CBE1N | CBE0N |
| x | 0 | 1 | 0 | 0 | 1 | 0 | 1 | 1 | 1 | 0 |
| x | 0 | 0 | 1 | 0 | 0 | 1 | 1 | 1 | 0 | 1 |
| x | 0 | 0 | 0 | 0 | 0 | 0 | 1 | 1 | 0 | 0 |
| x | 1 | 1 | 0 | 1 | 1 | 0 | 1 | 0 | 1 | 1 |
| x | 1 | 0 | 1 | 1 | 0 | 1 | 0 | 1 | 1 | 1 |
| x | 1 | 0 | 0 | 1 | 0 | 0 | 0 | 0 | 1 | 1 |

The CPU/Bus controller state machine 31 generates the proper I/O bus 23 control strobes for the I/O bus 23 after the CPU interface section has determined the type of I/O bus cycle requested by a system on board microprocessor such as CPU 11. The state machine 31 is a synchronous state machine which supplies the required bus control strobes with appropriate timing. The state machine 31 also generates data byte enable signals corresponding to the low order address lines, as well as the actual command strobes and system status signals. The state machine 31 also provides cycle status information signals internal to the CPU/Bus controller 21 to indicate which portion of the bus access cycle is currently being executed. In response to internal signals such as the last cycle signal on line 38 generated by the last access detect block 39 and external input signals to the CPU/Bus controller such as I/O ready signals and bus control strobe disable information (utilized in a fast on board memory access), the state machine 31 also generates the READY signal to the microprocessor 11.

The buffer control/byte enable block 37 generates the control signals which control the data path buffers 27 to control the data flow between the CPU 11 and the I/O bus 23. The byte enable (i.e., addresses) signals which are necessary for the devices on the I/O bus 23 to properly decode the access are also generated by the buffer control/byte enable block 37. There are 2 data bytes to be controlled in a 16-bit system and 4 data bytes in a 32-bit system. A portion of the data path comprise crossover buffers which steer data from the lower data word to the upper data word as well as from a lower byte to an upper byte. Three additional buffers can store information on the lower byte for presentation to the microprocessor on subsequent I/O bus commands. This is used when the microprocessor 11 requests a 16- or 32-bit access to an 8-bit device on the I/O bus 23. In this case, the CPU/Bus controller commands up to 4 I/O bus 23 accesses to satisfy the CPU 11 request.

Each access request from the microprocessor 11 can generate up to 4 data bytes. In order to satisfy a microprocessor request the CPU/Bus controller may have to access the I/O bus 23 up to 4 times; for example, a 32-bit request to a 8-bit device will require 4 access cycles.

The microprocessor 11, in the case of a 32-bit microprocessor can request up to 32 bits of data which requires 1 access cycle from a 32-bit device, 2 access cycles from a 16-bit device or 4 access cycles from an 8-bit device. Each block of 8 bits requested requires a data byte enable signal to be generated by the CPU/Bus controller. The number of bus access cycles required is a function of the microprocessor data width, the device data width and the request. When a request is made, the data starting address is provided to the CPU/Bus controller by the microprocessor 11. If the request is a 4-byte (i.e., 32 bits) request then the access cycle has to start at byte 0 or byte 4. A 2-byte request (i.e., 16 bits) can start at bytes 0, 1 or 2. Similarly, a 3-byte access can start at byte 0 or 1 and a 1-byte access can start at any byte level. Since a device access proceeds in a known sequence, once the state machine 31 knows when to commence the access cycles, all it then needs to know is when to stop the access operation; i.e., when the request has been satisfied. The last cycle detect block 39 determines when the process stops by comparing the current request information from the microprocessor, the accessed device data width size and the data byte address. The highest requested data byte address is compared with the current access cycle and the current data byte enable signal and a READY signal is generated when a match is found. The READY signal indicates to the CPU 11 that the access is complete and the data lines are valid.

Appendix II attached hereto lists the I/O bus access combinations as a function of possible data bytes and access device size. Appendix III attached hereto lists the proper byte enable signals corresponding to the different states of the information signals input by the I/O bus 23 and the CPU 11. Appendix IV attached hereto lists the conditions under which the last cycle detect block 39 generates a LAST CYCLE signal to the state machine 31 on line 38.

Figure 3C:
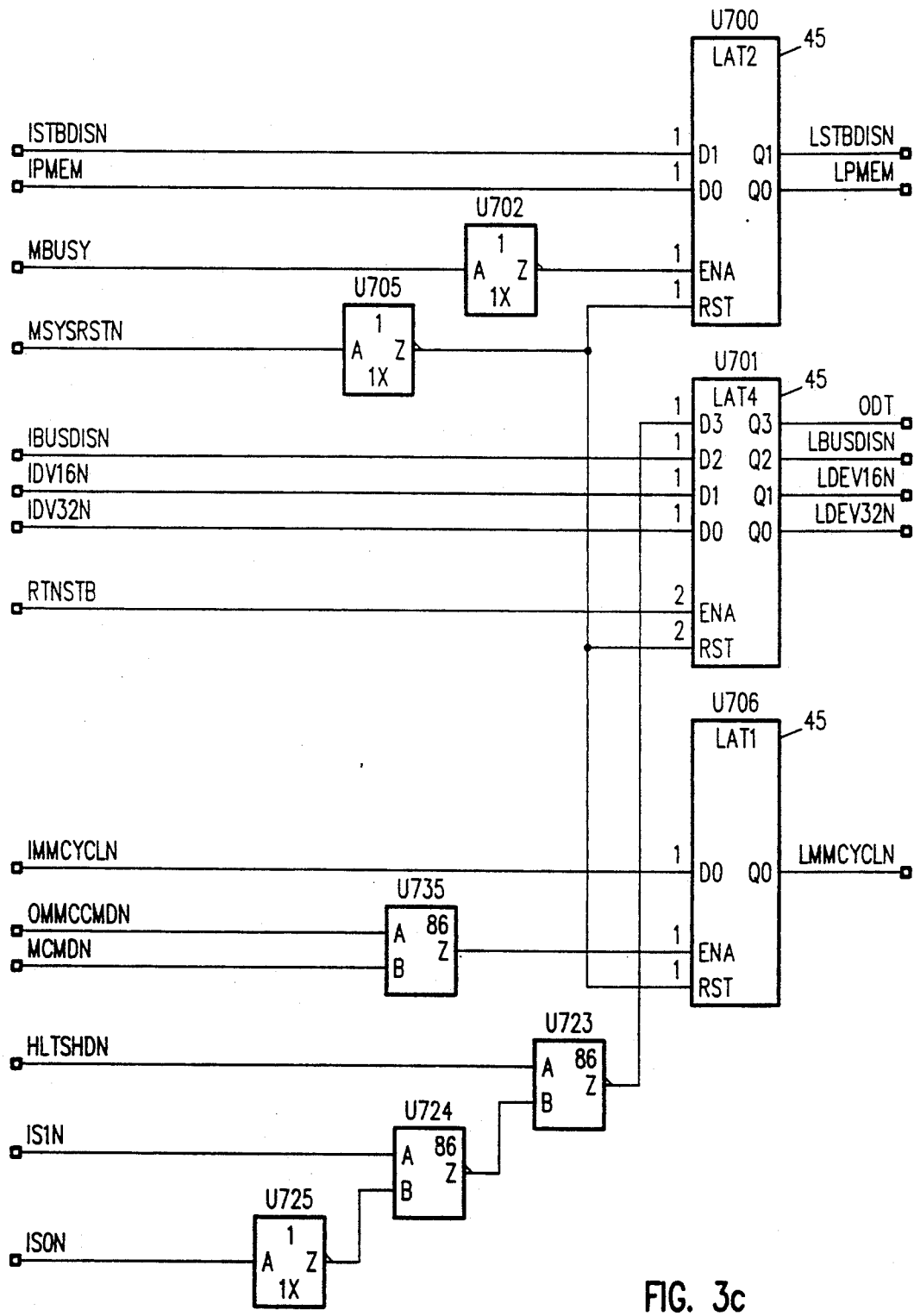
Figure 4B:
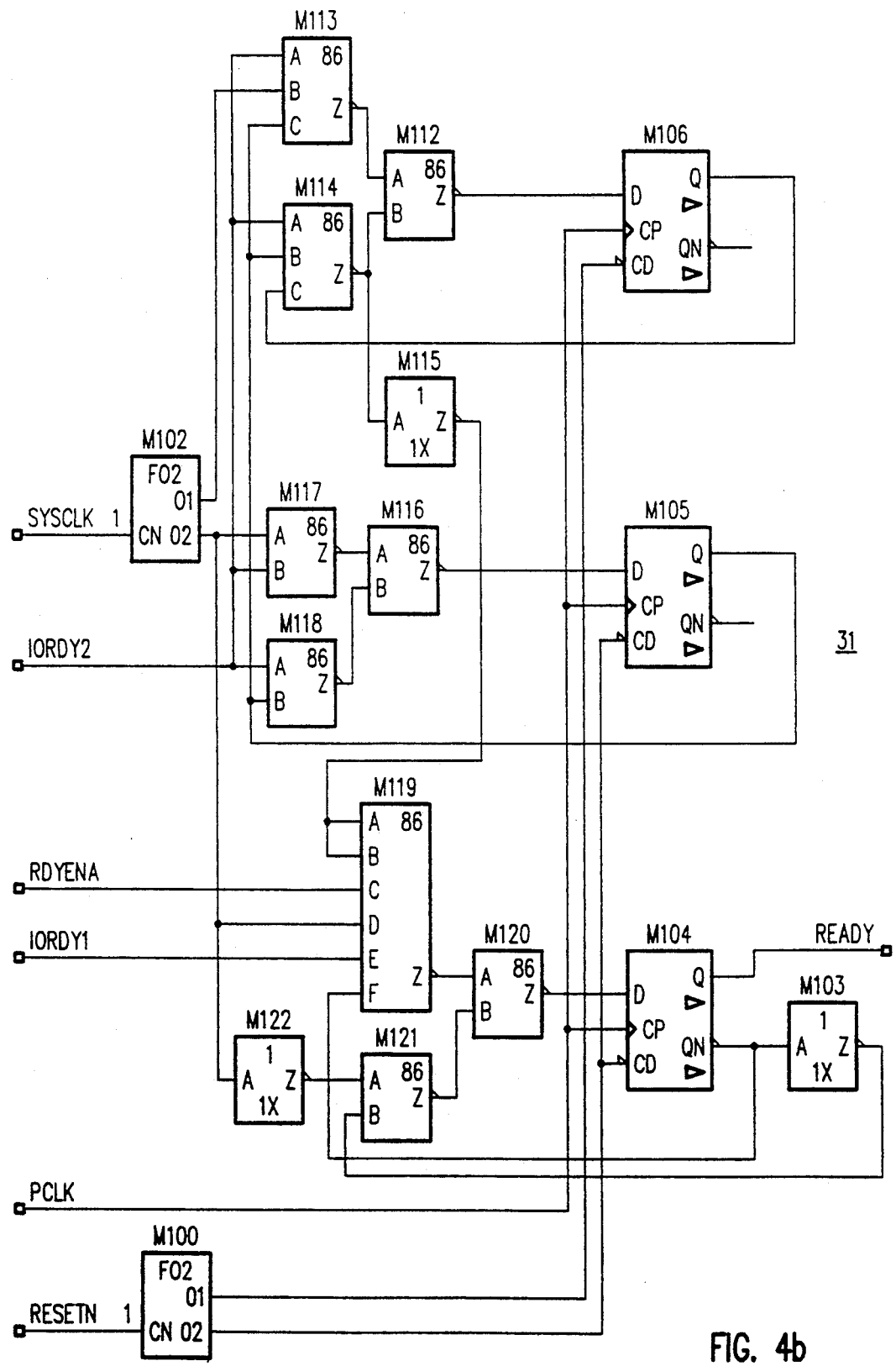
Figure 5A:
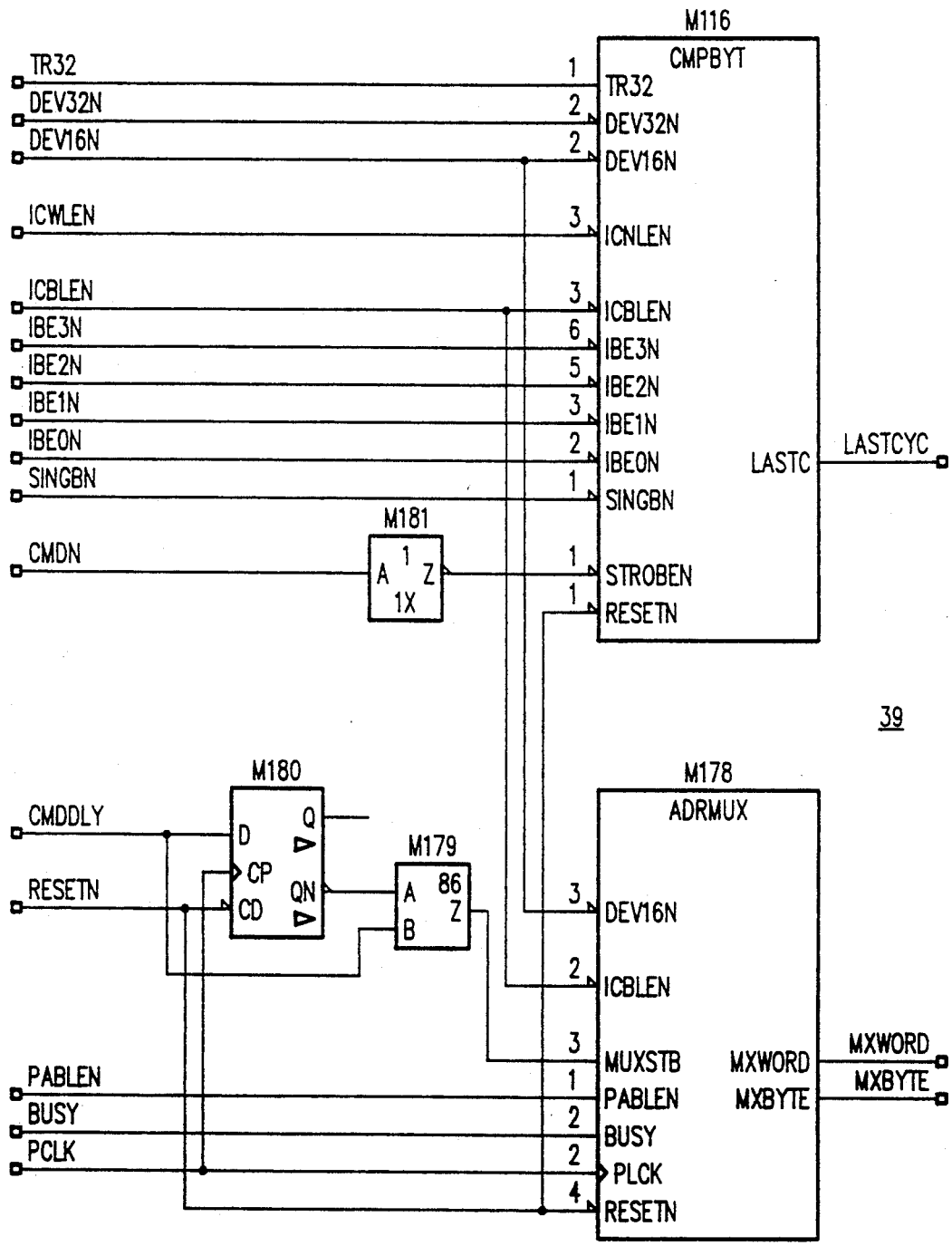
Figure 6:
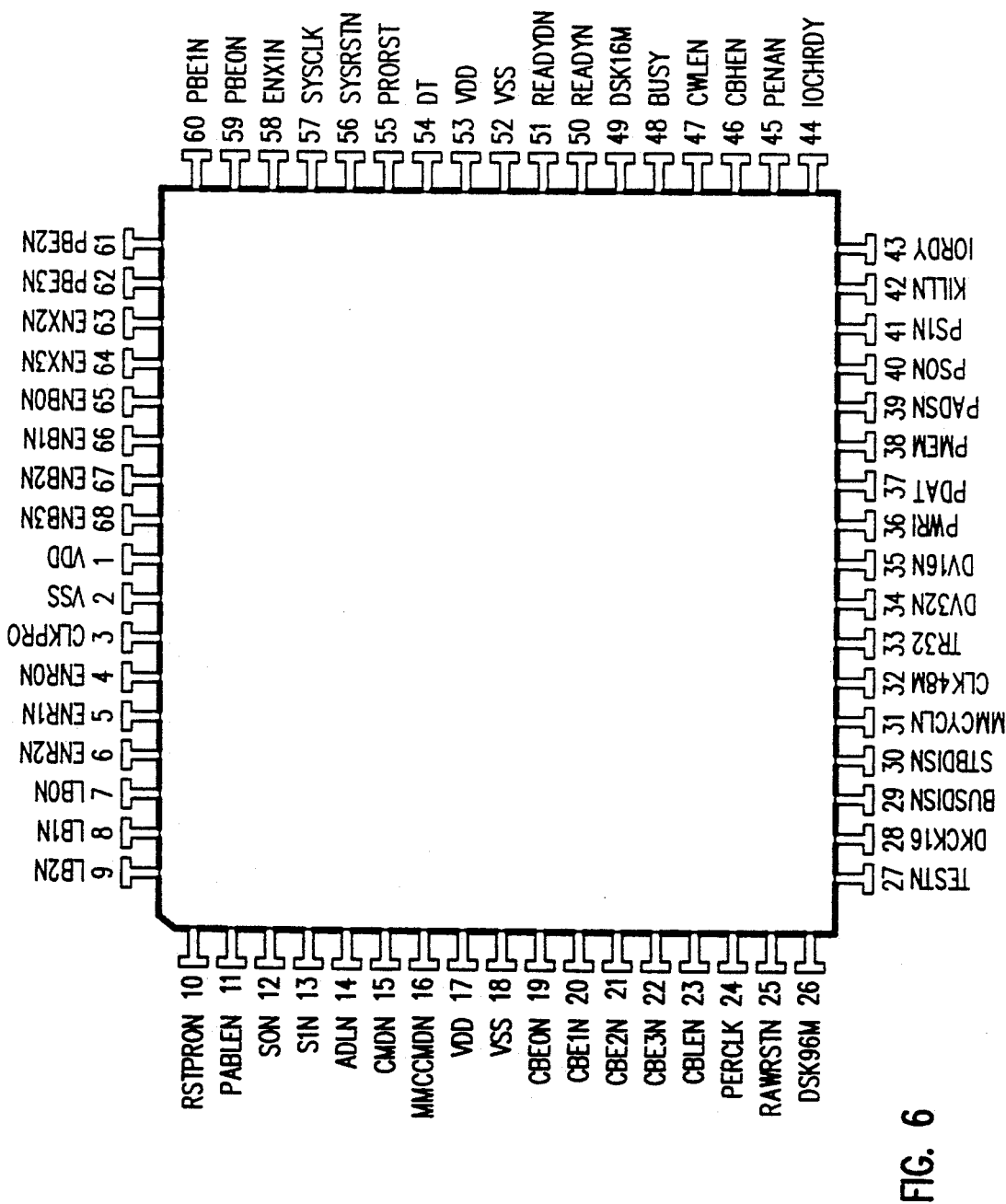
FIG. 6 is a diagram showing the package and pin layout for a VS2I chip implementing the CPU/Bus controller of the present invention.
Figure 7A:
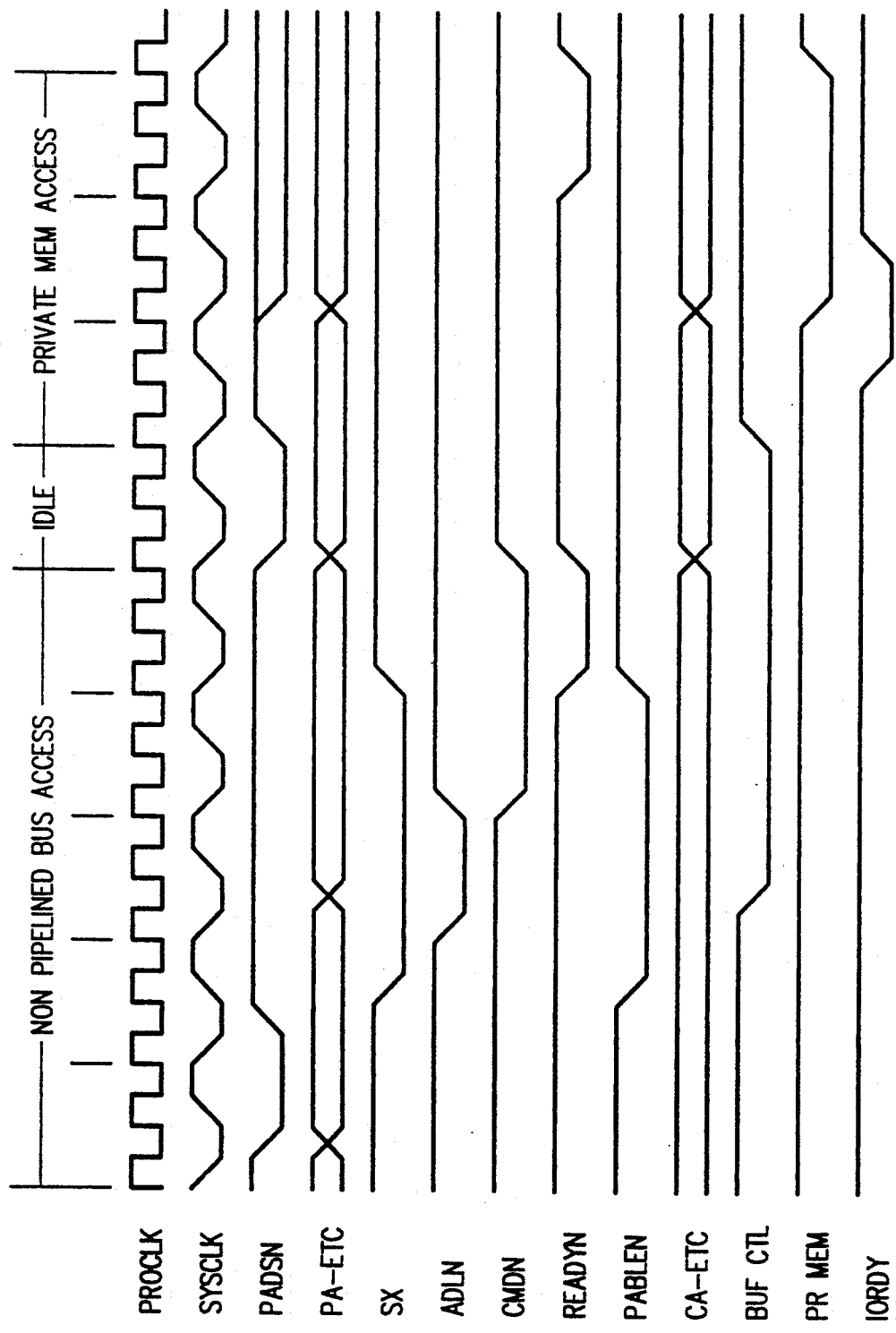
FIGS. 7a-7d are timing diagrams showing the relationship between various signal waveforms in the CPU/Bus controller of FIGS. 3a-3c.
Figure 7B:
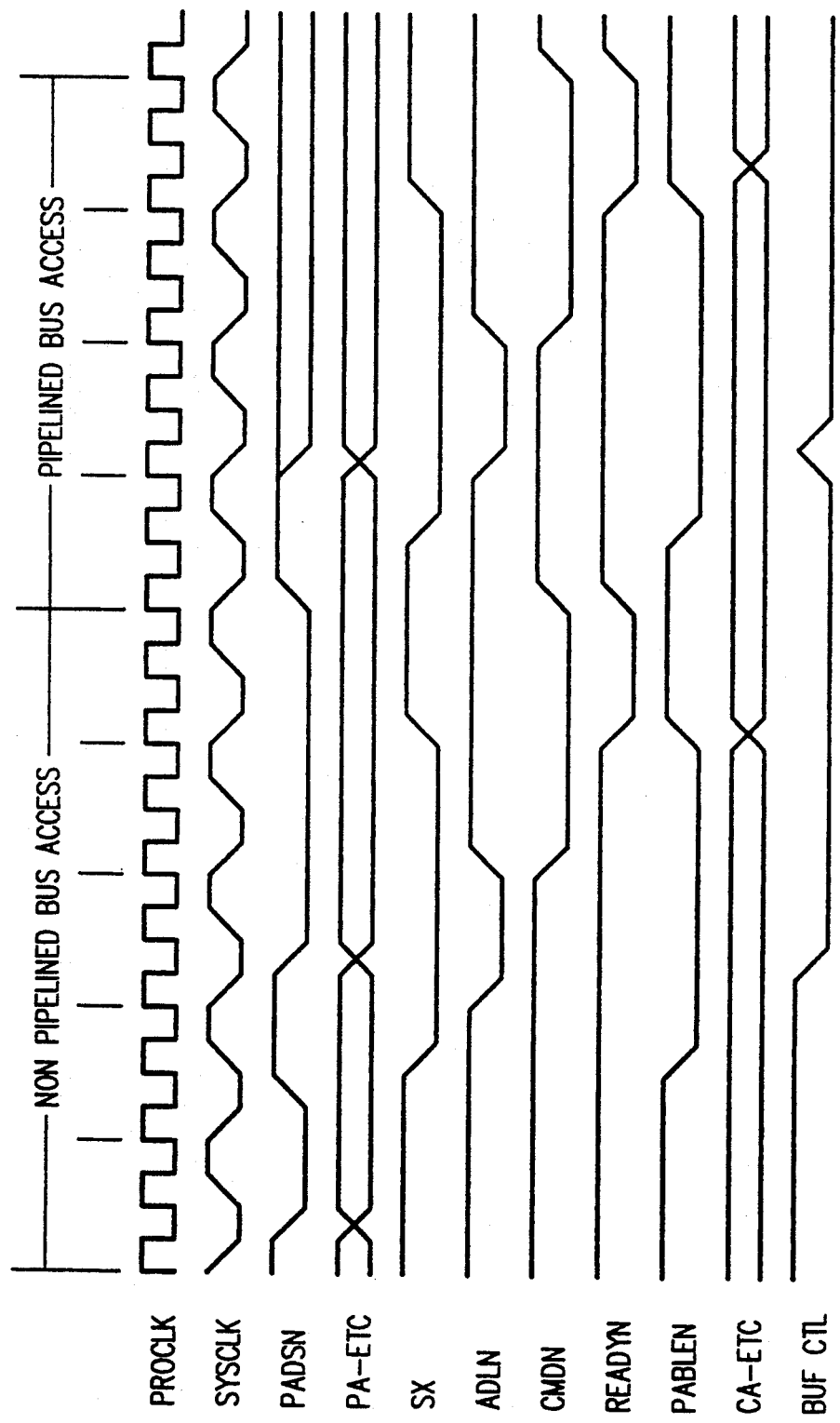
Figure 7C:
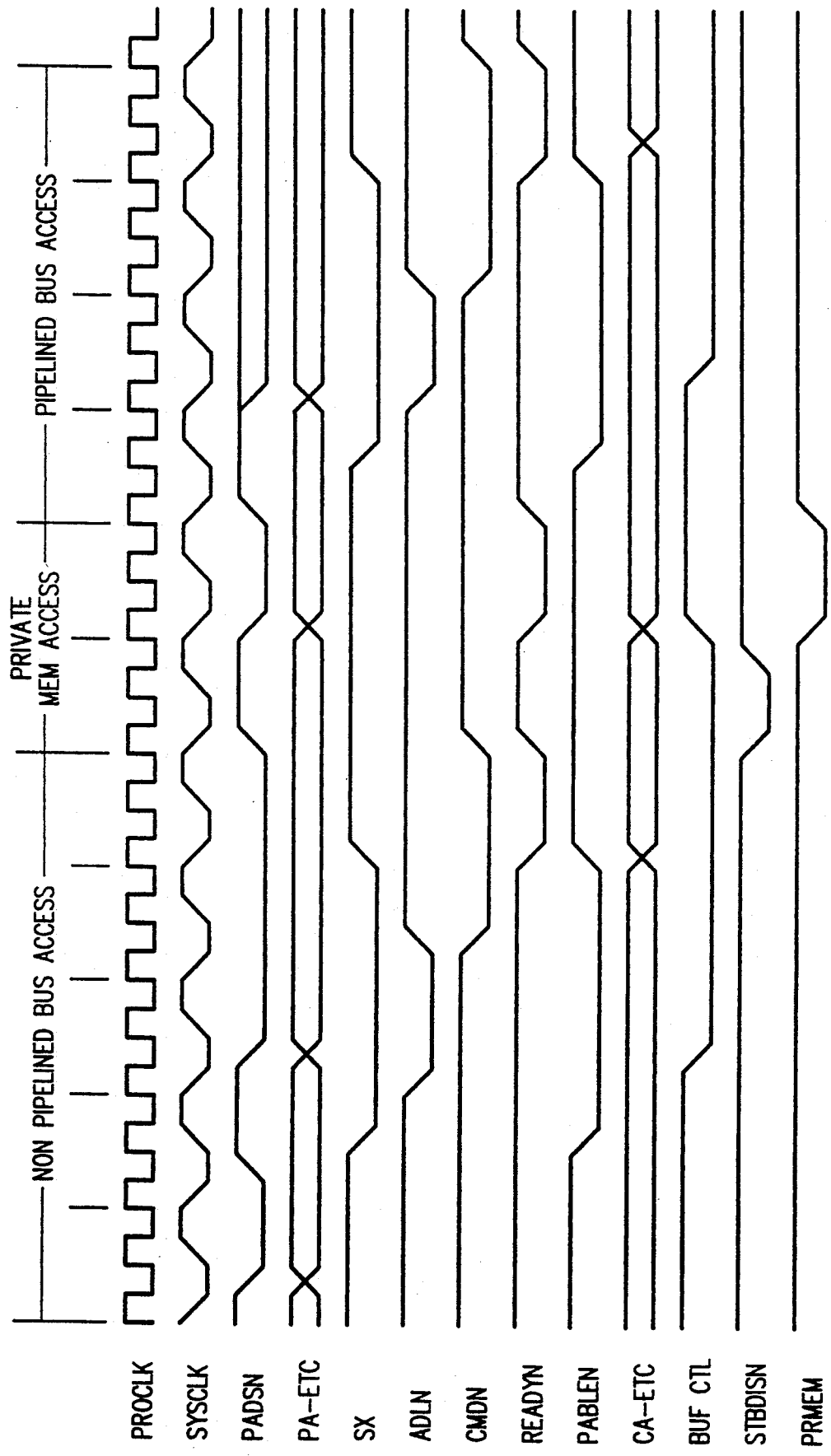
Figure 7D:
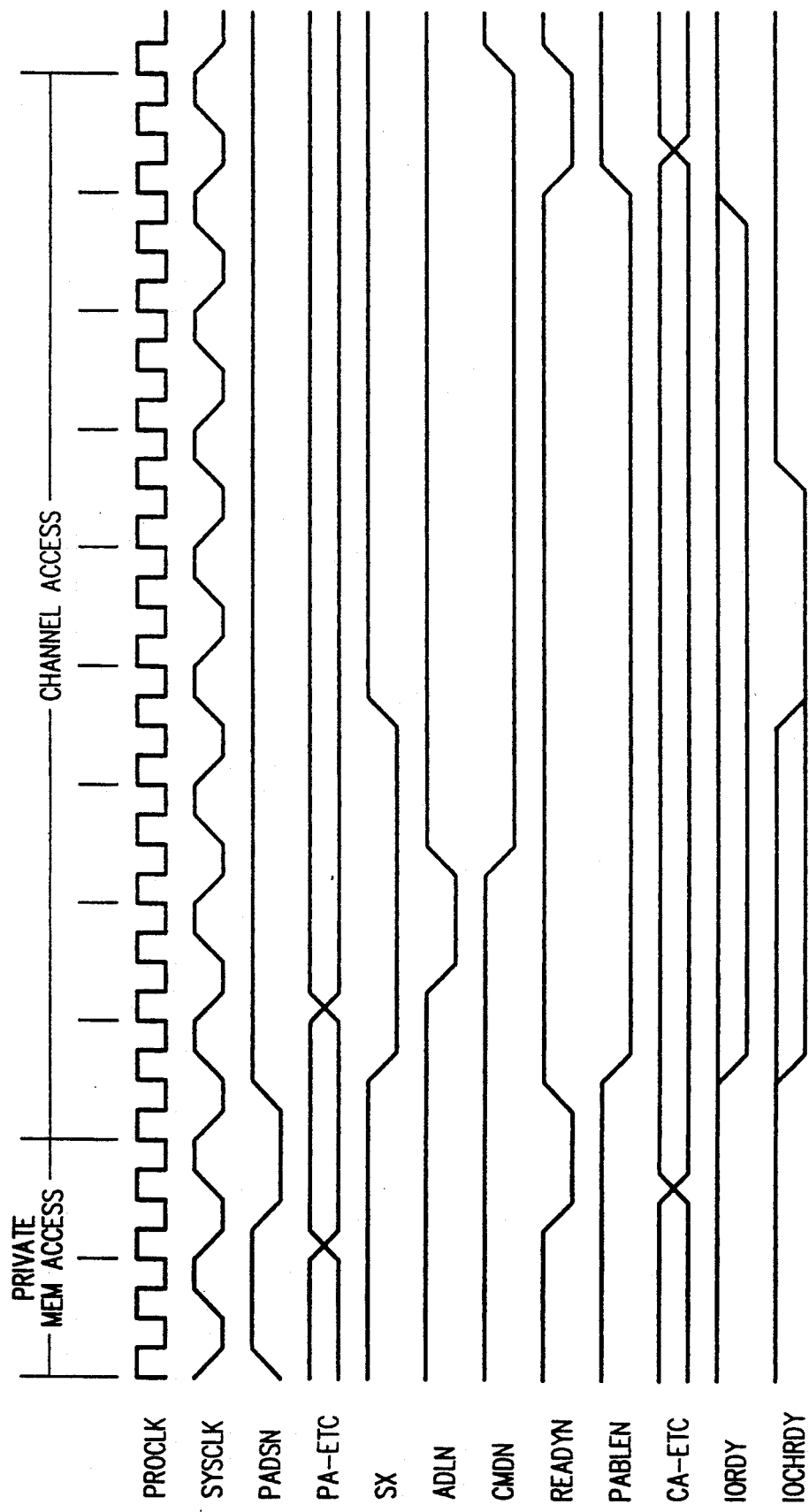

The preferred embodiment of the CPU/Bus controller 21 is implemented in one VLSI chip integrated circuit housed in a rectangular 68-pin package. FIGS. 3a, 3b, and 3c are a functional logic block diagram of the VLSI integrated circuit which implements CPU/Bus controller 21. FIGS. 4a and 4b are a detailed logic diagram of the CPU/Bus controller state machine 31 and FIGS. 5a and 5b are a detailed logic diagram of the last cycle detect block 39. The package layout and pin assignments are shown in FIG. 6. Appendix V attached hereto lists the electrical specifications for the VLS1 chip package. FIGS. 7a through 7d are timing diagrams showing the relationship between the various CPU/Bus controller signals for pipelined and non-pipelined I/O bus access and for private memory access.

Figure 8:
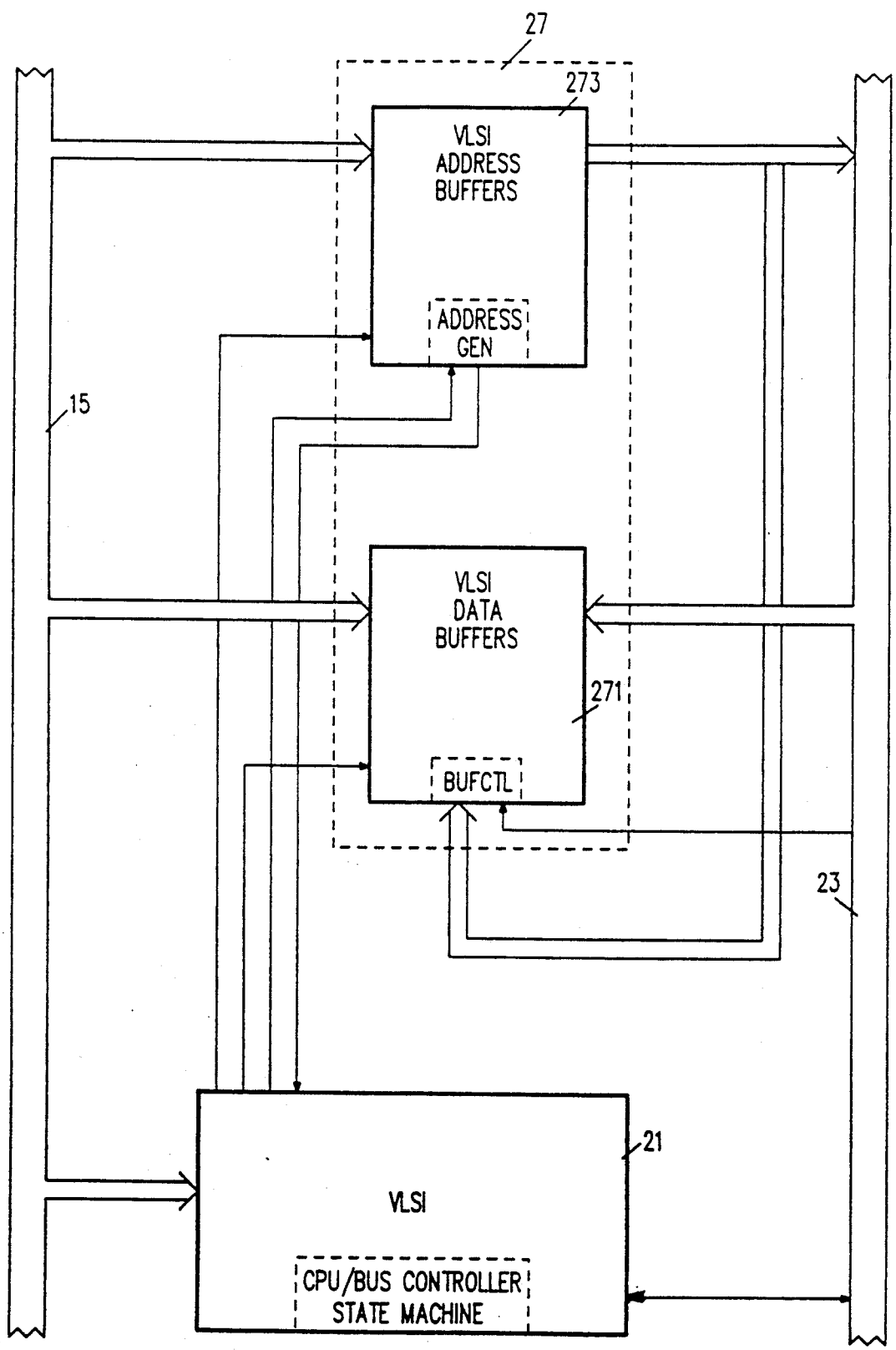
FIG. 8 is a conceptual block diagram of an alternate implementation of the bus controller of the present invention.

Alternatively, the functions of the buffer control/byte enable block 37 may be implemented in sections of the address/data buffers 27 as shown in FIG. 8 (the address/data buffers 27 may also be implemented as a separate VLSI chip). In this embodiment, the TTL buffers in the data buffer section 271 are controlled directly by address and byte enable signals which appear on the system main I/O bus 23. The data transfer enable bits (BHE and BLE) and the word enable bit utilized to select data addresses (WLE) are generated in the address buffer section 273. This provides for all of the address and byte enable signals to generated on the same chip and to have the same timing.

While the present invention has been described in conjunction with a specific embodiment thereof, it will be understood by those skilled in the art that alternatives, modifications and variations in form and detail may be made without departing from the spirit of the invention or exceeding the scope of the appended claims.

APPENDIX I

SIGNAL DEFINITIONS

CLOCK GENERATION

CLK48M: 48 MHz Oscillator Clock. An input signal used to generate DSK96M, DSK16M, and PERCLK.

CLKPRO: 40 MHz Oscillator Clock. An input signal used to run the Bus Controller state machine. A frequency of 40Mhz Yields a system speed of 20Mhz. Thus this signal is a 2X clock like the one which drives the iNTEL 80286, 80386, 80386sx, 80385 etc.

DKCK16: Disk Clock 16. The state of this input signal determines if DSK96M is 16 MHz (high) or 9.6 MHz (low).

DSK96M: A Variable Frequency Clock. This is an output signal used as the floppy disk clock. It is either 9.6 MHz or 16 MHz depending on the state of the DKCK16 input signal.

DSK16M: Disk Clock 16 MHz. This output signal is a clock which is the CLK48M divided by three. It can be used by the floppy disk controller or any other system element that needs a 16 MHz clock.

PERCLK: Peripheral Clock. An output signal that provides a frquency of 1.846 MHz for use in serial port applications. It is a divide by 26 of CLK48M.

SYSCLK: System Clock. An output signal that is used to synchronize the Bus / CPU Controller to the processor and the Memory Controller. Its frequency is equal to 1/2 the frequency of CLKPRO.

CPU INTERFACE

PADSN: Processor Address Status. This active low input signal from the processor indicates that an access has been requested and that a valid address is present on the processor output pins.

PDAT: Processor Data / -Control. This input signal from the processor indicates whether the current cycle is a Data (high) or Control (low) operation. (see table 1)

PS0N, PS1N: Processor Bus Cycle Status. These active low input signals indicate initiation of a bus cycle and define the bus cycle type in a 80286 system.

PENAN: Processor Enabled. This active low input is the hold acknowledge from the processor or a similiar function from the DMA. If it is not active, it releases the bus to to other devices and thus prevents contention.

IORDY: I/O Ready. This input delays the generation of READYN to the processor.

PBE0N - 3N: Processor Byte Enables. These active low inputs from the processor indicate which bytes of the data bus are involved with the current transfer. Internal circuitry determines from these signals the proper bus signals to enable. (see table 2)

PMEM: Processor Memory / -IO. This input signal from the processor indicates whether the current cycle is a Memory (high) or I/O (low) operation. (see table 1)

PRORST: Processor Reset. This active high output is used to reset the processor.

RAWRSTN: Raw Reset. This active low input causes the system including the processor to reset for as long as this input is low.

READYN: Ready. This active low output is the READY signal for a 80386 processor.

READYDN: Ready Delayed. This active low output is the READY signal for a 80286 processor. It is similiar to the READYN output signal but is delayed by one PROCLK.

RSTPRON: Reset Processor. This active low signal will produce the PRORST output signal, but will not reset the rest of the system.

SYSRSTN: System Reset. This active low output is used for general system reset.

PWRI: Processor Write / -Read. This input signal from the processor indicates whether the current cycle is a Write (high) or a Read (low). (see table 1)

KILLN: Shutdown Instruction. This active low signal is a decode of the processor shutdown insruction which causes a partial reset to the system. It goes to the GC183 DMA part to assure that there is proper timing of the reset to prevent partial DMA cycles from occuring.

MICROCHANNEL INTERFACE

ADLN: Address Decode Latch (MicroChannel signal). This active low output signal is used by channel devices to latch valid address and status bits.

CBE0N - 3N: Channel Bus Enables (MicroChannel signals). These active low output signals are used during 32-bit data transfers to indicate which bytes will be valid on the bus.

CBHEN: Channel Byte High Enable. This is an Iactive low bi-directional signal used to enable transfer of data on the high byte of the data bus. (see table 2)

CBLEN: Channel Byte Low Enable. This is an Iactive low bi-directional signal signal (same as address bit A0) used to enable transfer of data on the low byte of the data bus. (see table 2)

CMDN: Command (MicroChannel signal). This active low bi-directional signal is used to execute read and write commands on the micro channel bus.

CWLEN: Channel Word Low Enable. This is an Iactive low bi-directional signal (same as address bit A1) used to select (address) bytes of data. (see table 2)

DV16N: Data Size 16 Return (MicroChannel signal). This active low input signal allows the bus controller to monitor the data size information.

DV32N: Data Size 32 Return (MicroChannel signal). This active low input signal allows the bus controller to monitor the data size information.

IOCHRDY: I/O Channel Ready (MicroChannel signal - CD CHRDY). This input is used by a channel device to extend the time needed to complete an operation.

MMCCMDN: Matched Memory Cycle Command (MicroChannel signal). This active low output signal is used to indicate valid data on the bus during a Matched Memory cycle.

SON, S1N: Status Bits 0 and 1 (MicroChannel signals). These bi-directional signals indicate the start and type of a channel cycle. (see table 1)

TR32: Translate 32 (MicroChannel signal). When this input signal is low, it indicates that a 32 bit processor or bus master is driving the micro channel.

BUFFER CONTROL SIGNALS

BUSDISN: Bus Disable. This active low input signal disables data buffer control signals so that bus collisions are avoided when the CPU programs the numeric co-processor registers.

DT: Data Transmit. When this output signal is high, it enables data from the processor to the bus. When it is low, the data direction is from the bus to the processor.

LB0N - 2N: Latch Bytes. These active low signals go to the GC184 buffer chip and cause bytes on the bus to be saved in latches for a susequent read by the system processor as an assembled word. (used in conjunction with the ENRXN signals).

ENB0N - 3N: Enable Data Buffers. These active low output signals act as byte enable controls for the 32 bit data buffers.

ENR0N - ENR2N: Enable Latched Byte Read. These active low signals control reading of the byte latches contained within the GC184 bus buffer chip. This is part of the bus translation mechanism used for the reading of 32 bit quantities from devices with data paths as small as 8 bits.

ENX1N: Enable Byte Crossover. This active low output enables the data buffer to crossover from data byte 0 to data byte 1.

ENX2N: Enable Word Crossover. This active low output enables the data buffer to crossover the lower 16 bits to the upper 16 bits, (ie byte 0 to byte 2, and byte 1 to byte 3).

ENX3N: Enabe Byte Opposite Byte Crossover. This active low output enables the data buffer to crossover from data byte 0 to data byte 3.

MMCYCLN: Matched Memory Cycle. This active low input is used to indicate a Matched Memory cycle is in progress.

PABLEN: Processor Address Bus Latch Enable. This active low output signal is used to latch the address bus buffers.

STBDISN: Strobe Disable. This active low input signal will disable channel control strobes and buffer enables, as well as enabling the circuit which generates READYN to the processors thus allowwing main memory accesses to the processor.

TEST SIGNALS

BUSY: This active high output signal indicates that a processor request is being serviced.

TESTN: This active low input signal will tristate all of the outputs.

APPENDIX II

BUS ACCESS COMBINATIONS

| | FIRST: | SECOND: | THIRD: | FOURTH: | DEVICE SIZE: |
|---|---|---|---|---|---|
| *SINGLE:* | | | | | |
| | B3 | | | | 8/16/32 |
| | B2 | | | | 8/16/32 |
| | B1 | | | | 8/16/32 |
| | B0 | | | | 8/16/32 |
| | B2/B3 | | | | 16/32 |
| | B0/B1 | | | | 16/32 |
| | B0/B1/B2 | | | | 32 |
| | B1/B2/B3 | | | | 32 |
| | B0/B1/B2/B3 | | | | 32 |
| | B1/B2 | | | | 32 |
| *DOUBLE:* | | | | | |
| | B0 | B1 | | | 8 |
| | B2 | B3 | | | 8 |
| | B0/B1 | B2/B3 | | | 16 |
| | B0/B1 | B2 | | | 16 |
| | B1 | B2/B3 | | | 16 |
| | B1 | B2 | | | 16 |
| | B1 | B2 | | | 8 |
| *TRIPLE:* | | | | | |
| | B0 | B1 | B2 | | 8 |
| | B1 | B2 | B3 | | 8 |
| *QUADRUPLE:* | | | | | |
| | B0 | B1 | B2 | B3 | 8 |

APPENDIX III

DATA BUFFER ENABLES

Processor Buffer Enables:

ENB3    if:                                              PBE3N=0   &   TR32=0

ENB2    if:                                              PBE2N=0   &   TR32=0   &   DV16N=0
           or:   CWLEN=1 &                CBLEN=0 &                       TR32=0   &   DV16N=1
                (for enabling ENR2 during 8 bit device access)

| | | | | | |
|---|---|---|---|---|---|
| ENB1 | if: | | CBHEN=0 & | | TR32=1 |
| | or: | CWLEN=0 & | CBHEN=0 & | | TR32=0 |
| | or: | SINGBN=0 | | | |
| | | (16 bit and 32 bit processors require these different controls) | | | |
| ENB0 | if: | | CBLEN=0 & | | TR32=1 |
| | or: | CWLEN=0 & | CBLEN=0 & | | TR32=0 |
| | or: | SINGBN=0 | | | |
| | | (16 bit and 32 bit processors require these different controls) | | | |

Buffer Latch Controls:

LB2    if: CWLEN=1 & CBLEN=0

LB1    if: CWLEN=0

LB0    if: CWLEN=0 & CBLEN=0

Buffer Read Enables:

ENR2    if: DT=0   & ENB2N=1

ENR1    if: DT=0   & ENB1N=1

ENR0    if: DT=0   & ENB0N=1

DATA BUFFER ENABLES

Buffer Crossover Enables:

ENX3    if: CWLEN=1 & CBLEN=1 & DV32N=1 & DV16N=1 & TR32=0
        (32 bit processor crossover)

ENX2    if: CWLEN=1 &              DV32N=1 & DV16N=0 & TR32=0
        or: CWLEN=1 & CBLEN=0 & DV32N=1 & DV16N=1 & TR32=0
        or: CWLEN=1 &              DV32N=0 &              TR32=1
        (32 bit processor crossover if 16 bit device)
        (32 bit processor crossover if 8 bit device)
        (16 bit processor crossover if 32 bit device)

ENX1    if: CWLEN=0 & CBLEN=1 &              DV16N=1 &              CBHEN=0
        or:              CBLEN=1 &              DV16N=1 & TR32=1 & CBHEN=0
        (32 bit or 16 bit processor crossover if A1=0)
        (16 bit processor crossover ignores A1)

APPENDIX IV

Last Access Detect:

LAST    if: SINGBN=0
        (INTA, HALT, and SHUTDOWN)

or: DV32N=0
        (32 bit device always single access)

or: DV32N=1 & DV16N=0 &
        or: DV32N=1 & DV16N=0 & PBE3N=1 & PBE2N=1 &                    TR32=1
        or: DV32N=1 & DV16N=0 &                                CWLEN=1 & TR32=0

(16 bit device and 16 bit processor will be single access)
(16 bit device and 32 bit processor will be single access if lower word access)
(16 bit device and 32 bit processor will be last access if A1=1)

|     |           |           |           |           |           |           |           |
|-----|-----------|-----------|-----------|-----------|-----------|-----------|-----------|
| or: | DV16N=1 & | PBE3N=0 & |           |           | CWLEN=1 & | CBLEN=1   |           |
| or: | DV16N=1 & | PBE3N=1 & | PBE2N=0 & |           | CWLEN=1 & | CBLEN=0   |           |
| or: | DV16N=1 & | PBE3N=1 & | PBE2N=1 & | PBE1N=0 & | CBLEN=1   |           |           |
| or: | DV16N=1 & | PBE3N=1 & | PBE2N=1 & | PBE1N=1   |           |           |           |
| or: | DV16N=1 & | PBE3N=1 & | PBE2N=1 & |           |           | PBE0N=1   |           |
| or: | DV16N=1 & | PBE3N=1 & |           | PBE1N=1 & | PBE0N=1   |           |           |
| or: | DV16N=1 & |           | PBE2N=1 & | PBE1N=1 & | PBE0N=1   |           |           |

TR32=0

APPENDIX V

ELECTRICAL SPECIFICATION:

```
Design                           L1A4601
Company                          BULL
Engineer                         RON LARSON
```

LMA9K Product Code LMA9050C

| Buffer | Type | Attribute | Parameter | Condition | Pins |
|--------|------|-----------|-----------|-----------|------|
| DRVT4  | I    | TTL       | VIL=(VSS,0.8V)<br>VIH=(2.0V,VDD)<br>IIL=(-10UA,N/A)<br>IIH=(N/A,10UA) | 4.75V<VDD<5.25V<br>4.75V<VDD<5.25V<br>VIN=0.00V<br>VIN=VDD | CLKPRO=3 |
| SCHMITC | I   | SHMT      | VIL=(VSS,1.0V)<br>VIH=(4.0V,VDD)<br>IIL=(-10UA,N/A)<br>IIH=(N/A,10UA) | 4.75V<VDD<5.25V<br>4.75V<VDD<5.25V<br>VIN=0.00V<br>VIN=VDD | RAWRSTN=25 |
| TLCHT  | I    | TTL       | VIL=(VSS,0.8V)<br>VIH=(2.0V,VDD)<br>IIL=(-10UA,N/A)<br>IIH=(N/A,10UA) | 4.75V<VDD<5.25V<br>4.75V<VDD<5.25V<br>VIN=0.00V<br>VIN=VDD | RSTPRON=10,<br>TESTN=27,<br>DKCK16=28,<br>BUSDISN=29,<br>STBDISN=30,<br>MMCYCLN=31,<br>CLK48M=32,<br>TR32=33,<br>DV32N=34,<br>DV16N=35,<br>PWRI=36,<br>PDAT=37,<br>PMEM=38,<br>PADSN=39,<br>PSON=40,<br>PSIN=41,<br>IORDY=43,<br>IOCHRDY=44,<br>PENAN=45,<br>PBE0N=59,<br>PBE1N=60,<br>PBE2N=61,<br>PBE3N=62 |
| BD4T   | B    | TTL<br><br><br><br>Z | VIL=(VSS,0.8V)<br>VIH=(2.0V,VDD)<br>IIL=(-10UA,N/A)<br>IIH=(N/A,10UA)<br>VOL=(VSS,0.4V)<br>VOH=(2.4V,VDD)<br>IOZL=(-10UA,N/A)<br>IOZH=(N/A,10UA)<br>IOSL=(20MA,110MA)<br>IOSH=(-10MA,-80MA) | 4.75V<VDD<5.25V<br>4.75V<VDD<5.25V<br>VIN=0.00V<br>VIN=VDD<br>0.0MA<IOL<4.0MA<br>-4.0MA<IOH<-0.0MA<br>VO=VSS<br>VO=VDD<br>VO=VDD<br>VO=VSS | SON=12,<br>S1N=13,<br>CMDN=15,<br>CBE0N=19,<br>CBE1N=20,<br>CBE2N=21,<br>CBE3N=22,<br>CBLEN=23,<br>CBHEN=46,<br>CWLEN=47 |
| B4     | O    |           | VOL=(VSS,0.4V)<br>VOH=(2.4V,VDD)<br>IOSL=(20MA,110MA)<br>IOSH=(-10MA,-80MA) | 0.0MA<IOL<4.0MA<br>-4.0MA<IOH<-0.0MA<br>VO=VDD<br>VO=VSS | BUSY=48 |
| BT4    | O    | Z         | VOL=(VSS,0.4V)<br>VOH=(2.4V,VDD) | 0.0MA<IOL<4.0MA<br>-4.0MA<IOH<-0.0MA | LB0N=7,<br>LB1N=8, |

```
     IOZL=(-10UA,N/A)      VO=VSS         LB2N=9,
     IOZH=(N/A,10UA)       VO=VDD         ADLN=14,
     IOSL=(20MA,110MA)     VO=VDD         MMCCMDN=16,
     IOSH=(-10MA,-80MA)    VO=VSS         READYN=50,
                                          READYDN=51,
                                          PRORST=55,
                                          SYSRSTN=56,
                                          SYSCLK=57
```

APPENDIX V

```
-------------------------------------------------------------------------------
BT4R    O  Z,SLEW   VOL=(VSS,0.4V)       0.0MA<IOL<4.0MA     EMROM=4,
                    VOH=(2.4V,VDD)       -4.0MA<IOH<-0.0MA   ENR1N=5,
                    IOZL=(-10UA,N/A)     VO=VSS              ENR2N=6,
                    IOZH=(N/A,10UA)      VO=VDD              PERCLK=24,
                    IOSL=(20MA,110MA)    VO=VDD              DSK96M=26,
                    IOSH=(-10MA,-80MA)   VO=VSS              KILLN=42,
                                                             DSK16M=49,
                                                             ENX1N=58,
                                                             ENX2N=63,
                                                             ENX3N=64,
                                                             ENB0N=65,
                                                             ENB1N=66,
                                                             ENB2N=67,
                                                             ENB3N=68
-------------------------------------------------------------------------------
BT8R    O  Z,SLEW   VOL=(VSS,0.4V)       0.0MA<IOL<8.0MA     PABLEN=11
                    VOH=(2.4V,VDD)       -8.0MA<IOH<-0.0MA
                    IOZL=(-10UA,N/A)     VO=VSS
                    IOZH=(N/A,10UA)      VO=VDD
-------------------------------------------------------------------------------
BT8RP   O  Z,SLEW   VOL=(VSS,0.4V)       0.0MA<IOL<8.0MA     DT=54
                    VOH=(2.4V,VDD)       -8.0MA<IOH<-0.0MA
                    IOZL=(-10UA,N/A)     VO=VSS
                    IOZH=(N/A,10UA)      VO=VDD
-------------------------------------------------------------------------------

IDD  : 100NA/GATE

Number of gates used  : N/A

Notes :

1. Specifications valid over the COMMERCIAL temperature range
   0C < TEMP < 70C for 4.75V < VDD < 5.25V
2. The pin numbers above are SENTRY tester channels. MC26 package
3. N/A indicates data is unavailable or not applicable
```

I claim:

1. In a computer system having a microprocessor, with a data path having a microprocessor data path width, and controllable devices, each with a data path having a device data path width and being coupled to an input/output bus, an apparatus for controlling input/output transfer operations on said input/output bus in response to microprocessor requests, said apparatus comprising:

state machine means coupled to said microprocessor and said input/output bus and responsive to command signals from said microprocessor and to responsive control signals from said devices coupled to said input/output bus for generating input/output bus control signals based on said command signals and said responsive control signals from said devices, said input/output bus, and said devices being responsive to said input/output bus control signals, said state machine means initiating and controlling input/output transfer operations on said input/output bus in response to said microprocessor requests;

width detection means, coupled to said microprocessor, for determining the microprocessor data path width of said microprocessor and providing a microprocessor path width signal indicative of said microprocessor data path width; and last cycle detection means coupled to said microprocessor, said input/output bus, said width detection means, and said state machine means for detecting said device data path width of said devices, based on said responsive control signals from said devices, said last cycle detection means being responsive to said command signals and said input/output bus control signals for detection of the last input/output transfer operation of a current microprocessor-requested operation based on said microprocessor path width signal, said device data path width of said devices, said command signals, and said input/output bus control signals, and said last cycle detection means generating a last cycle signal indicative of detection of said last input/output transfer operation.

2. Apparatus as in claim 1 wherein said state machine means is responsive to said last cycle signal for generating a ready signal at the completion of said last input/output transfer operation of said current microprocessor-requested operation indicating that said apparatus is ready to receive a next requested operation.

3. Apparatus as in claim 1 further comprising status interpreter means coupled between said microprocessor and said state machine means for receiving said command signals and for generating state machine stimulus signals in response to said command signals, said state machine means being responsive to said state machine stimulus signals to initiate microprocessor-requested operations.

4. Apparatus as in claim 1 further including enable detect means coupled to said microprocessor and to said input/output bus, said enable detect means being responsive to said command signals for generating input-/output bus data enable signals.

5. Apparatus as in claim 4 further comprising:
buffer control means coupled to said state machine means, to said input/output bus, to said last cycle detection means and to said enable detect means for generating enable signals and direction control signals; and
data path and address buffer means, coupled to said buffer control means and to said input/output bus, for controlling data flow on said input/output bus in response to said enable signals and said direction control signals.

6. Apparatus as in claim 3 further including:
master clock means coupled to said state machine means for producing a plurality of master clock signals: and
clock signal generating means, coupled to said state machine means, to said status interpreter means, and to said master clock means for generating a plurality of secondary clock signals in response to said plurality of master clock signals, at least one of the plurality of secondary clock signals being provided for use by the status interpreter means.

7. Apparatus as in claim 6 further comprising reset control means coupled to said clock signal generating means and responsive to a shutdown signal for generating a processor reset signal to reset the microprocessor.

8. Apparatus as in claim 7 wherein said state machine means is responsive to said state machine stimulus signals for generating a shutdown signal and providing said shutdown signal to said reset control means and said detection means, said reset control means generating said processor reset signal in response to said shutdown signal and wherein said state machine means is responsive to said state machine stimulus signals for generating a halt signal and providing the halt signal to said detection means, said detection means being responsive to said halt signal to cause said state machine means to execute a halt input/output operation wherein no controllable devices are accessed.

9. In a multiple processor computer system having controllable devices coupled to an input/output bus, an input/output bus controller for controlling operations on said input/output bus in response to processor requests, said processor-requested operations each comprising a plurality of input/output transfer operations said input/output bus controller comprising:
processor interface means coupled to said multiple processors and said input/output bus for detecting a type of operation requested by said multiple processors based on said processor requests from said processors and for generating stimulus signals based on the type of operation requested, wherein said processor interface means comprises:

last cycle detection means responsive to said processor requests and said response control signals for detection of a last input/output transfer operation of a current processor-requested operation and for generating a last cycle signal indicative of detection of said last input/output transfer operation;
enable detection means responsive to said processor requests and said response control signals for determining the data width of said multiple processors and for generating enable signals indicative of the number of data bytes required to complete the current processor-requested operation;
status means responsive to said processor requests and said response control signals for determining a type of operation requested and for generating said stimulus signals based on the type of operation requested;
state machine means coupled to said input/output bus and to said processor interface means for initiating and controlling said processor-requested operations on said input/output bus in response to said stimulus signals from said processor interface means and in response to response control signals from said controllable devices;
input/output bus, for receiving and storing data and address information;
buffer control means coupled to said state machine means and receiving inputs from said state machine means, said processor interface means, and said input/output bus and being coupled to said data path and address buffer means, said buffer control means for generating enable and data flow control signals, in response to said inputs, to control the data path and address buffer means for controlled data flow and address flow on said input/output bus;
each one of said multiple processors having data widths;
said controllable devices having data widths;
said bus controller controlling said processor-requested operations between said multiple processors and said controllable devices based on the data widths of the multiple processors and the data widths of said controllable devices;
master clock means coupled to said state machine means for producing a plurality of master clock signals; and
clock signal generating means coupled to said state machine means, said status means and to said master clock means, responsive to said plurality of master clock signals for generating a plurality of secondary clock signals, at least one of the plurality of secondary clock signals being provided for use by said status means.

10. An input/output bus controller as in claim 9 wherein said processor interface means includes last cycle detection means responsive to said processor requests and said response control signals for detection of a last input/output transfer operation of a current processor-requested operation and for generating a last cycle signal indicative of detection of said last input-/output transfer operation.

11. An input/output controller as in claim 9 further comprising reset control means coupled to said clock signal generating means and responsive to a shutdown signal for generating a processor reset signal to reset said multiple processors.

12. An input/output bus controller as in claim 9 wherein said input/output bus controller is implemented in a VLSI chip.

13. An input/output bus controller as in claim 11 wherein said state machine means generates a halt signal, in response to corresponding stimulus signals generated by said status means, and provides said halt signal to said detection means, said detection means being responsive to said halt signal to cause said state machine means to execute a halt operation wherein no controllable devices are accessed, and wherein said state machine means generates a shutdown signal and provides said shutdown signal to said reset control means and said detection means in response to corresponding stimulus signals generated by said status means, said reset control means generating said processor reset signal in response to said shutdown signal.

14. An input/output bus controller as in claim 9 wherein said input/output bus controller is a synchronous controller synchronous with the master clock signals.

15. An input/output bus controller as in claim 14 wherein said wherein said input/output bus is an asynchronous bus.

16. A method of controlling access operations between controllable devices in response to command signals representing requested access operations from a processor and response control signals from said controllable devices wherein the device data path width of said controllable devices may be different from the processor data path width of said processor, said method comprising the steps of:
   determining a number of data bytes requested in a requested access operation;
   determining the data path width of the processor;
   determining the data path width of the controllable device accessed during the requested access operation;
   transmitting signals representing data, device control signals, address information signals and processor command signals along an interfacing input/output bus based on a type of requested access operation;
   generating input/output bus control signals to control the interfacing input/output bus in response to stimulus signals corresponding to the type of requested access operation;
   determining a last cycle required to complete the requested access operation based on the number of data bytes requested, the processor data path width of the processor and the device data path width of the controllable device accessed during the requested access operation; and
   generating a ready signal in response to a determination of said last cycle, said ready signal indicating to said processor that a next access operation may be requested wherein generating a ready signal includes:
      comparing a highest requested data byte address with a current access cycle data byte address; and
      generating said ready signal when said highest requested data byte address matches said current access cycle data byte address.

17. An apparatus for controlling access operations between a controller and a controllable device based on operations request signals received from the controller, and based on control signals from the controllable device, the controller and the controllable device each having a data path with a data path width, and the controllable device being coupled to an input/output (I/O) bus, the apparatus comprising:
   a controller interface, coupled to the controller, for receiving the operation request signals from the controller, for determining what type of operation the controller has requested and a starting address for executing the operation requested based on the operation request signals, and for determining the data path width of the controller based on the operation request signals;
   a sequential circuit coupled to the controller interface and the I/O bus, the sequential circuit sequentially executing a number of access cycles based on the starting address for the operation requested and based on the type of operation requested, the sequential circuit providing a cycle status signal indicative of a status of the sequential access cycles currently being executed; and
   last cycle detection means, coupled to the controller interface, the sequential circuit and the I/O bus, for determining the data path width of the controllable device based on a signal received from the I/O bus, and for determining whether an access cycle currently being executed by the sequential circuit is a last access cycle required to complete the operation requested based on the data path width of the controllable device, based on the cycle status signal, and based on the operation request signals, wherein the last cycle detection means provides a last cycle signal to the sequential circuit indicative of detection of a last required cycle, the sequential circuit continuing execution of access cycles until the sequential circuit receives the last cycle signal, and the sequential circuit ceasing execution of access cycles in response to the last cycle signal.

18. The apparatus of claim 17 wherein the requested access operation is a data read operation and wherein the controller interface comprises:
   means, coupled to the controller, for determining bit locations on the data bus of the controller at which to provide data during the data read operation.

19. The apparatus of claim 17 wherein the controller interface comprises:
   bit enable detection means, coupled to the controller to receive the operation request signals, for detecting bits to be accessed by the controller and for providing a bit signal indicative of the bits to be accessed.

20. The apparatus of claim 19 wherein the controller interface comprises:
   status interpreter means, coupled to the controller, for receiving the operation request signals and for determining the type of operation requested based on the operation request signals and for providing an operation type signal indicative of the type of operation requested.

21. The apparatus of claim 20 wherein the last cycle detection means comprises:
   evaluation means, coupled to the bit enable detection means, the status interpreter means and the sequential circuit, for evaluating the operation request signals, the cycle status signal, the bit signal and the data path width of the controllable device to detect whether the present access cycle is the last required access cycle.

22. The apparatus of claim 17 wherein the sequential circuit is synchronous with the controller and wherein the I/O bus is asynchronous with the controller.

23. The apparatus of claim 22 wherein the sequential circuit provides bus control signals to the I/o bus with desired timing based on the control signals from the controllable devices.

24. The apparatus of claim 17 wherein the sequential circuit provides a ready signal to the controller in response to ceasing execution of the access cycles, the ready signal indicating that the apparatus is ready to receive a subsequent operation request signal.

25. The input/output bus controller of claim 9 wherein the data width of one of said multiple processors is different from the data width of another of said multiple processors.

26. The input/output bus controller of claim 9 wherein the data width of at least one of said multiple processors is different from the data width of at least one of said controllable devices.

* * * * *

UNITED STATES PATENT AND TRADEMARK OFFICE
CERTIFICATE OF CORRECTION

PATENT NO. : 5,220,651

DATED : June 15, 1993

INVENTOR(S) : RONALD J. LARSON

It is certified that error appears in the above-identified patent and that said Letters Patent is hereby corrected as shown below:

Col. 25, line 62, delete "operations", insert --operation--

Signed and Sealed this

Eighth Day of February, 1994

Attest:

BRUCE LEHMAN

Attesting Officer

Commissioner of Patents and Trademarks